(12) United States Patent
Hatasaki et al.

(10) Patent No.: US 8,706,850 B2
(45) Date of Patent: Apr. 22, 2014

(54) COMPUTER SYSTEM AND CONFIGURATION MANAGEMENT METHOD THEREFOR

(75) Inventors: Keisuke Hatasaki, Kawasaki (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 939 days.

(21) Appl. No.: 12/486,293

(22) Filed: Jun. 17, 2009

(65) Prior Publication Data

US 2010/0100611 A1    Apr. 22, 2010

(30) Foreign Application Priority Data

Oct. 16, 2008    (JP) ................................ 2008-267541

(51) Int. Cl.
*G06F 15/177* (2006.01)
*G06F 15/173* (2006.01)
*G06F 15/16* (2006.01)

(52) U.S. Cl.
USPC ............................ 709/221; 709/223; 709/229

(58) Field of Classification Search
USPC ......................................................... 709/221
See application file for complete search history.

(56) References Cited

U.S. PATENT DOCUMENTS

| | | | | |
|---|---|---|---|---|
| 5,325,497 | A * | 6/1994 | Jaffe et al. .................... | 711/114 |
| 6,260,120 | B1 * | 7/2001 | Blumenau et al. ............ | 711/152 |
| 7,702,851 | B2 * | 4/2010 | Satoyama et al. ............ | 711/114 |
| 2001/0052016 | A1 * | 12/2001 | Skene et al. .................. | 709/226 |
| 2003/0009619 | A1 | 1/2003 | Kano et al. | |
| 2006/0047924 | A1 * | 3/2006 | Aoshima et al. ............. | 711/161 |
| 2007/0073988 | A1 * | 3/2007 | Shibayama et al. .......... | 711/165 |
| 2007/0136447 | A1 | 6/2007 | Nakajima et al. | |
| 2008/0215843 | A1 * | 9/2008 | Nasu et al. .................... | 711/170 |
| 2009/0249018 | A1 * | 10/2009 | Nojima et al. ................ | 711/170 |
| 2012/0124287 | A1 * | 5/2012 | Shibayama et al. .......... | 711/114 |

FOREIGN PATENT DOCUMENTS

JP    2005-011210    1/2005

* cited by examiner

*Primary Examiner* — Ario Etienne
*Assistant Examiner* — Blake Rubin
(74) *Attorney, Agent, or Firm* — Foley & Lardner LLP

(57) ABSTRACT

Provided is a computer system that requires only a server administrator for construction thereof and configuration change thereof. A management server acquires connection destination interface identifiers set for external apparatuses, stores the connection destination interface identifiers into a first table, acquires specifications of server computers and identifiers of the server computers, stores the specifications and the identifiers into a second table, acquires specifications of external apparatuses, stores the specifications into the first table, receives a profile to be deployed onto one of the server computers, acquires a server computer satisfying the profile from the second table, acquires an external apparatus satisfying the profile from the first table, acquires a connection destination interface identifier from the first table, and notifies the server computer acquired from the second table of the acquired interface identifier, and the server computer updates an interface identifier of an interface by the received interface identifier.

9 Claims, 31 Drawing Sheets

IDENTIFIER POOL TABLE 31

| CLASS (311) | IDENTIFIER (312) | IN-USE FLAG (313) |
|---|---|---|
| NETWORK | MAC1 | IN USE |
| | MAC2 | POOLED |
| | MAC3 | POOLED |
| | MAC4 | POOLED |
| | MAC5 | POOLED |
| | MAC6 | POOLED |
| | MAC7 | IN USE |
| | MAC8 | POOLED |
| | MAC9 | POOLED |
| STORAGE | WWN1 | IN USE |
| | WWN2 | IN USE |
| | WWN3 | POOLED |
| | WWN4 | POOLED |
| | WWN5 | POOLED |
| | WWN6 | POOLED |
| | WWN7 | IN USE |
| | WWN8 | IN USE |
| | WWN9 | POOLED |

*FIG. 5*

SERVER POOL TABLE 32

| SERVER IDENTIFIER (321) | STATE (322) | SPECIFICATION (323) | CONNECTION DESTINATION (324) | GROUP (325) |
|---|---|---|---|---|
| SERVER 1 | IN USE | CPU : Xeon 3.0GHz 2Core<br>MEMORY : 4GB<br>NIC1<br>HBA1 | NIC1 : NETWORK1, NETWORK2, NETWORK3<br>HBA1 : STORAGE SYSTEM 1, STORAGE SYSTEM 2 | A |
| SERVER 2 | POOLED | CPU : Xeon 3.2GHz 8Core<br>MEMORY : 16GB<br>NIC1<br>HBA1, HBA2 | NIC1 : NETWORK1, NETWORK3<br>HBA1:STORAGE SYSTEM 1<br>HBA2:STORAGE SYSTEM 2 | B |
| SERVER 3 | POOLED | CPU : Xeon 3.0GHz 4Core<br>MEMORY : 4GB<br>NIC1<br>HBA1 | NIC1 : NETWORK1, NETWORK2, NETWORK3<br>HBA1:STORAGE SYSTEM 1 | B |
| SERVER 4 | POOLED | CPU : Xeon 3.0GHz 2Core<br>MEMORY : 2GB<br>NIC1<br>HBA1 | NIC1 : NETWORK1, NETWORK2, NETWORK3<br>HBA1:STORAGE SYSTEM 1, STORAGE SYSTEM 2 | C |

*FIG. 6*

NETWORK POOL TABLE 33

| NETWORK INTERFACE IDENTIFIER | STATE | BELONGING | VIRTUAL NETWORK | GROUP |
|---|---|---|---|---|
| MAC1 | IN USE | NETWORK 1 | VLAN1 | A |
| MAC2 | POOLED | NETWORK 1 | VLAN2 | A |
| MAC3 | POOLED | NETWORK 2 | VLAN3 | A |
| MAC4 | POOLED | NETWORK 2 | VLAN4 | B |
| MAC5 | POOLED | NETWORK 3 | VLAN5 | B |
| MAC6 | POOLED | NETWORK 3 | VLAN5 | B |
| MAC7 | IN USE | NETWORK 3 | VLAN7 | B |
| MAC8 | POOLED | NETWORK 3 | VLAN8 | B |

*FIG. 7*

STORAGE POOL TABLE  34

| STORAGE INTERFACE IDENTIFIER (341) | STATE (342) | BELONGING (343) | LU (344) | LU CAPACITY (345) | ATTRIBUTE INFORMATION (346) | SHARED (347) | GROUP (348) |
|---|---|---|---|---|---|---|---|
| WWN1 | IN USE | STORAGE SYSTEM 1 | LU1 | 20GB | FOR OS:Windows | | A |
| WWN2 | IN USE | STORAGE SYSTEM 1 | LU2 | 200GB | | ○ | A |
| WWN3 | POOLED | STORAGE SYSTEM 1 | LU2 | 200GB | | ○ | A |
| WWN4 | POOLED | STORAGE SYSTEM 2 | LU3 | 30GB | | | B |
| WWN5 | POOLED | STORAGE SYSTEM 2 | LU4 | 40GB | FOR CLUSTER | ○ | B |
| WWN7 | IN USE | STORAGE SYSTEM 2 | LU4 | 40GB | FOR CLUSTER | ○ | B |
| WWN8 | IN USE | STORAGE SYSTEM 1 | LU5 | 40GB | | | B |
| WWN9 | POOLED | STORAGE SYSTEM 2 | LU6 | 30GB | FOR OS:Linux | | B |

FIG. 8

PROFILE DB  40

| | 401 | 402 | 403 | 404 | DETERMINED INTERFACE IDENTIFIER | |
|---|---|---|---|---|---|---|
| | PROFILE NAME | OS | SPECIFICATION | DEPLOYMENT SERVER | NETWORK | STORAGE |
| | PROFILE 1 | LINUX | CPU : Xeon 3.0GHz 2Core<br>MEMORY : 4GB<br>MEMORY #1 : VALN1<br>STORAGE#1 : 20GB NOT-SHARE<br>STORAGE #2 : 200GB SHARE:LU2 | SERVER 1 | NIC1:MAC1 | HBA1: WWN1<br>HBA2: WWN2 |
| | PROFILE 2 | Windows | CPU : Xeon 3000MHz 4 Core<br>MEMORY : 4000MB<br>MEMORY #1 : VALN4<br>STORAGE #1 : 30GB NOT-SHARE | UNDEPLOYED | - | - |

COMPUTER SYSTEM AND CONFIGURATION MANAGEMENT METHOD THEREFOR

CLAIM OF PRIORITY

The present application claims priority from Japanese patent application JP2008-267541 filed on Oct. 16, 2008, the content of which is hereby incorporated by reference into this application.

BACKGROUND OF THE INVENTION

This invention relates to a computer system, in particular, a configuration management method of managing connections among a server, a network, and a storage.

The computer system is configured by physically coupling the server, the network, and the storage with one another by wire. However, in order to flexibly operate the computer system, it is desirable that the connections among the server, the network, and the storage can be flexibly changed.

Conventional technologies for realizing such a computer system include a technology of constructing a virtual network group in a network (for example, MAC-based VLAN) and a technology of constructing a logical disk system from a disk array provided to a storage system (see, for example, US2003/0009619A). By using those technologies, it is possible to flexibly change connection relationships among the server, the network, and the storage.

SUMMARY OF THE INVENTION

However, even by using the above-mentioned conventional methods, in construction of the computer system and configuration change thereof, a server administrator needs to notify a network administrator and a storage administrator of requirements for the network and the storage to be coupled by the server administrator, respectively, and to carry out setting works for the network and the storage that conform to the requirements. Therefore, the construction of the computer system and the configuration change thereof take a large number of processing steps and a long period of time.

The above-mentioned situation causes such a significant problem that a load rapidly increases particularly on tasks running on the computer system in a case of promptly constructing an execution environment for an OS and an application. In other words, at a data center or the like, in order for the server administrator to change a server configuration, the server administrator needs to request the network administrator and the storage administrator to change a network configuration (for example, routing) and a storage configuration (for example, path), respectively, and wait until the network administrator and the storage administrator both complete the changing requested by the server administrator. This leads to a problem that it is difficult for the server administrator to promptly change the server configuration.

It is an object of this invention to allow construction of a computer system and configuration change thereof solely by a server administrator managing connections among a server, a network, and a storage which are involved in the construction of the computer system and the configuration change thereof.

A representative aspect of this invention is as follows. A server-computer configuration management method of managing a configuration of a plurality of server computers, which is used for a computer system comprising: the plurality of server computers; a management server for managing the plurality of server computers; an interface for coupling one of the plurality of server computers and at least one of a plurality of external apparatuses; and a communication path in which one of the plurality of external apparatuses that performs communications is set in correspondence with an interface identifier set for the interface, the server-computer configuration management method comprising: acquiring, by the management server, connection destination interface identifiers set for the plurality of external apparatuses, and storing the connection destination interface identifiers into a first table; acquiring, by the management server, specifications of the plurality of server computers and identifiers of the plurality of server computers, and storing the specifications and the identifiers into a second table; acquiring, by the management server, specifications of the plurality of external apparatuses, and storing the specifications into the first table; receiving, by the management server, a profile to be deployed onto the one of the plurality of server computers; acquiring, by the management server, a server computer satisfying the profile from the second table; acquiring, by the management server, an external apparatus satisfying the profile from the first table, and acquiring a connection destination interface identifier for the acquired external apparatus from the first table; notifying, by the management server, the server computer acquired from the second table of the connection destination interface identifier acquired from the first table; and updating, by the server computer, the interface identifier of the interface on the server computer to the connection destination interface identifier received from the management server.

According to this invention, the construction of the computer system and the configuration change thereof are performed without the intermediation of the administrator (for example, network administrator or storage administrator) of an external apparatus coupled to the server computer, or a management device (for example, network management server or storage management server) for the external apparatus, which makes it possible to reduce the number of processing steps and a period of time related to the construction of the computer system and the configuration change thereof.

BRIEF DESCRIPTION OF THE DRAWINGS

FIG. 5 illustrates an example of the identifier pool table.

FIG. 6 illustrates an example of the server pool table.

FIG. 7 illustrates an example of the network pool table.

FIG. 8 illustrates an example of the storage pool table.

FIG. 12 illustrates an example of information (profile) held in the profile DB.

DETAILED DESCRIPTION OF THE PREFERRED EMBODIMENTS

Hereinafter, description is made of embodiments of this invention referring to the accompanying drawings.

(First Embodiment)

Figure 1:
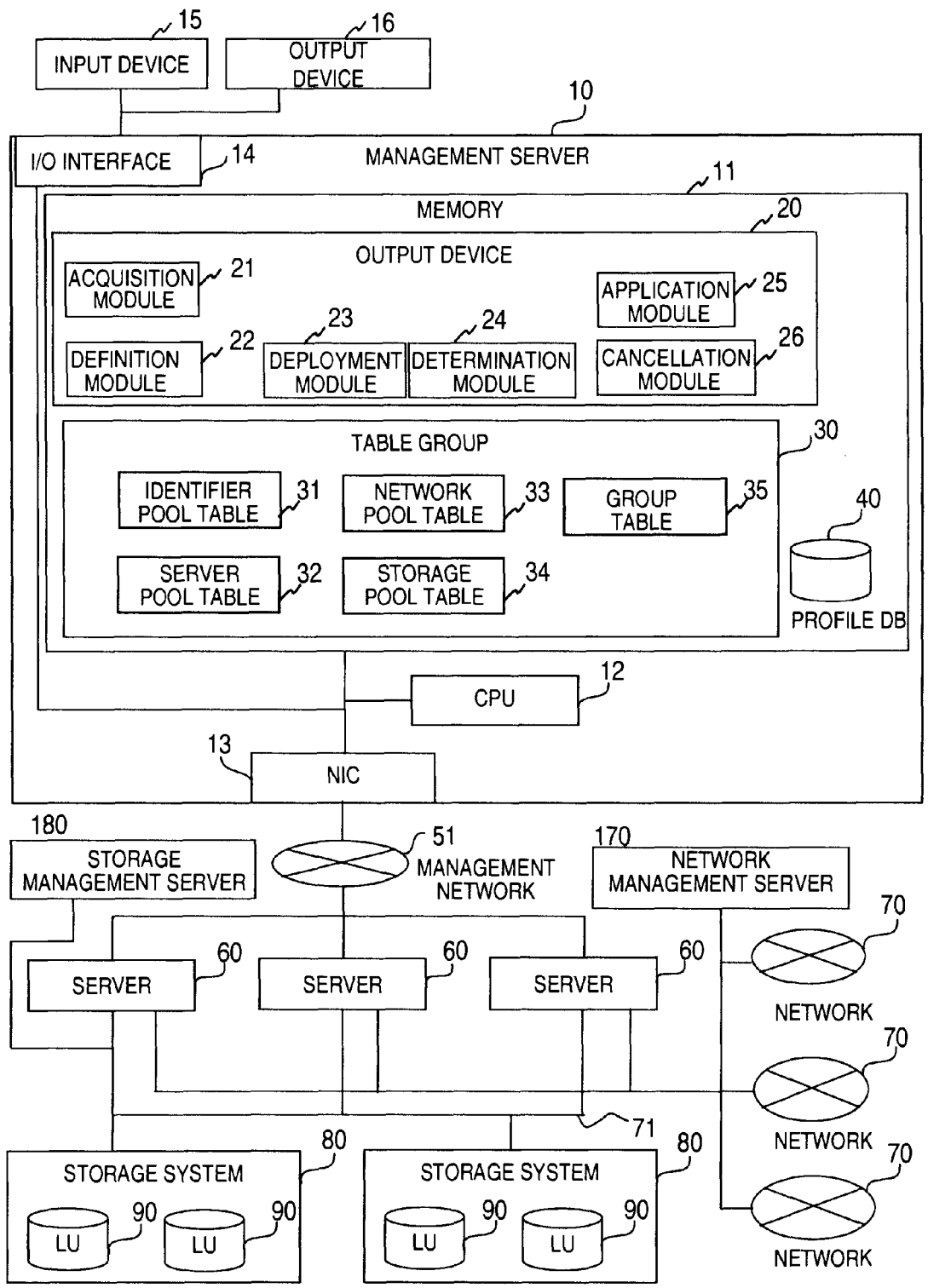
FIG. 1 is a block diagram illustrating a configuration of a computer system according to a first embodiment.

FIG. 1 is a block diagram illustrating a configuration of a computer system according to a first embodiment. The computer system according to this embodiment includes a management server 10, an input device 15, an output device 16, a management network 51, at least one server 60, at least one network 70, at least one storage system 80, and a storage area network (SAN) 71 for coupling the at least one server 60 with the at least one storage system 80. Further, the storage system 80 includes at least one logical unit (LU) 90. Here, the LU 90 represents a logical disk. The management server 10 includes a memory 11 that holds a configuration management program 20, a table group 30, and a profile DB 40. The at least one network 70 has communication paths therefore managed by a network management server 170. The SAN 71 and the at least one storage system 80 have access paths therefor managed by a storage management server 180.

The management server 10 includes a network interface card (NIC) 13 for connection to the management network 51, and is coupled to each of the servers 60 via the management network 51.

It should be noted that in this embodiment, the configuration management program 20 is described as a program executed by a CPU (or processor) 12, but may be implemented by hardware or firmware installed on the management server 10 or a combination thereof. Alternatively, the configuration management program 20 is stored in the LU 90 serving as a storage medium, loaded into the memory 11 before execution thereof, and then executed by the CPU 12.

In addition, the management server 10 may include therein an auxiliary storage device such as a hard disk drive or a flash memory, or be coupled to an external storage device system via an I/O interface 14, to thereby hold the table group 30 and the profile DB 40 in the auxiliary storage device or the external storage device system.

The input device 15 represents a mouse and a keyboard, and the output device 16 represents a display device such as a display, both being used for input/output of information between the management server 10 and a user (or server administrator).

The network 70 represents at least one network apparatus and a network system configured by coupling the at least one network apparatus with one another. The network apparatuses are specifically a network switch, a router, a load balancer, and a firewall.

The storage system 80 represents a storage device system such as at least one redundant arrays of inexpensive disks (RAID) system.

The configuration management program 20 includes an acquisition module 21 for acquiring configuration information on the server 60, the network 70, and the storage system 80 and other such information, a definition module 22 for defining a profile that is requirement definitions of the server 60, the network 70, and the storage system 80, a deployment module 23 for deploying the profile onto the server 60, a determination module 24 for determining a connection configuration for the network 70 and the storage system 80 based on the profile, an application module 25 for applying the determined connection configuration for the network 70 and the storage system 80, and a cancellation module 26 for canceling the connection configuration for the server 60, the network 70, and the storage system 80.

The table group 30 includes an identifier pool table 31 for holding a list of interface identifiers of the network 70 and the storage system 80, which are previously pooled, a server pool table 32 for holding a list of the servers 60 that are pooled, a network pool table 33 for holding a list of the networks 70 that are pooled, and a storage pool table 34 for holding a list of the storage systems 80 that are pooled. The profile DB holds a list of defined profiles. It should be noted that the profile represents specification information and software information for defining an execution environment for an OS and an application.

Figure 2:
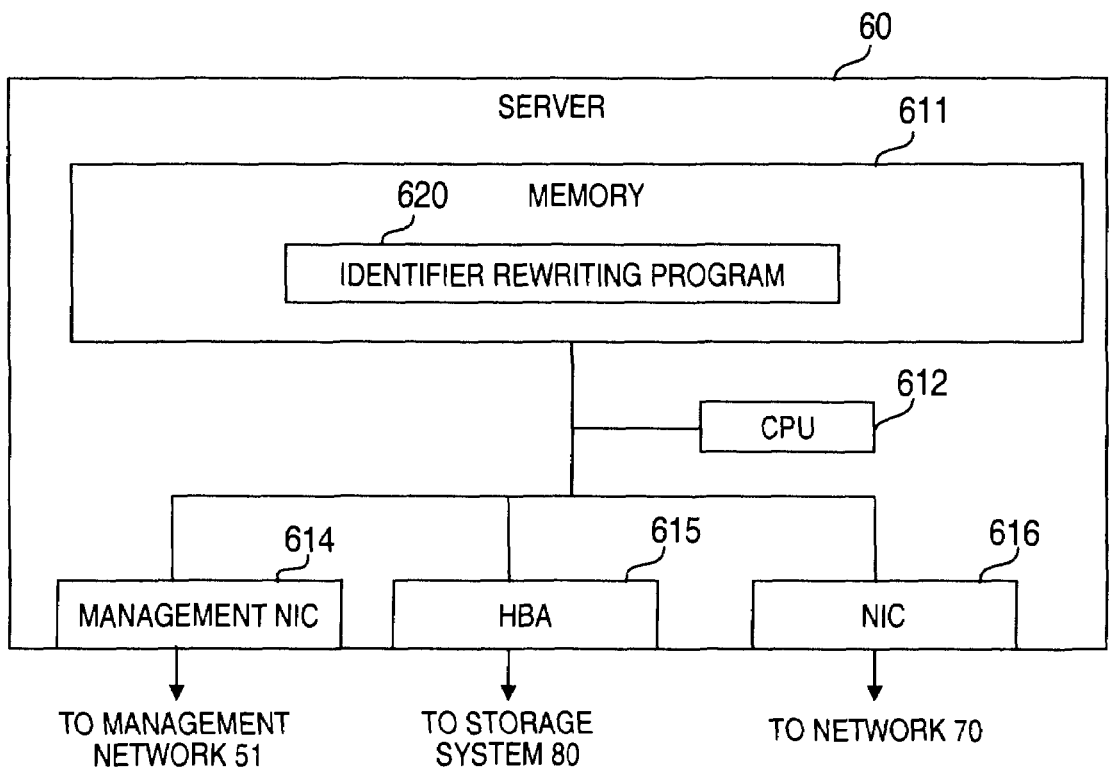
FIG. 2 is a block diagram illustrating a configuration of the server.

FIG. 2 is a block diagram illustrating a configuration of the server 60. The server 60 includes a memory 611, a CPU 612, a management network interface card (NIC) 614, at least one host bus adaptor (HBA) 615, and at least one NIC 616. It should be noted that the server 60 may include an auxiliary storage device such as a hard disk drive or a flash memory. The management NIC 614 is coupled to the management network 51. The HBA 615 is coupled to the storage system 80 via the SAN 71. The NIC 616 is coupled to the network 70. It should be noted that a plurality of HBAs and a plurality of NICs may be installed. The memory 611 holds an identifier rewriting program 620. It should be noted that in this embodiment, the identifier rewriting program 620 is described as a program executed by the CPU 612, but may be implemented by hardware or firmware installed on the server 60 or a combination thereof. It should be noted that the HBA 615 and the NIC 616 each function as an I/O interface for allowing the server 60 to perform communications with an external apparatus or device (network 70 or storage system 80, respectively). The I/O interfaces of the server 60 include the HBA 615 and the NIC 616 as first interfaces whose communication path to the external apparatus is decided by the interface identifier, and the I/O interface 14 of FIG. 1 as a second interface that uses a fixed communication path to perform communications with the input device 15 and the output device 16. In the following description, the HBA 615 and the NIC 616 serving as the first interfaces are generically referred to simply as the I/O interfaces. It should be noted that the first interface is exemplified by the HBA 615 and the NIC 616, but may be any I/O interface as long as its communication path and a connection destination apparatus (or device) are decided by the interface identifier.

In response to an instruction received from the configuration management program 20, the identifier rewriting program 620 rewrites a network interface identifier of the NIC 616 and a storage interface identifier of the HBA 615. Here, the network interface identifier is specifically a MAC address. The storage interface identifier is specifically a world wide name (WWN). However, in a case where an IP-SAN such as an iSCSI is used for a connection between the server 60 and the storage system 80, the storage interface identifier may be an iSCSI name.

Boot-up and suspension of each of the servers 60 are controlled by a command received from the management server 10. The server 60 boots up upon reception of a boot command (for example, Wake on lAN) from the management server 10. During boot-up, the server 60 loads the identifier rewriting program 620 into the memory 611, and the CPU 612 executes the identifier rewriting program 620. The identifier rewriting program 620 can be stored in a ROM (not shown) of the server 60, or can be downloaded from the management server 10.

The server 60 that has completed the boot-up has an identifier unique to the NIC 616 set as the interface identifier of the NIC 616. In addition, the server 60 that has completed the boot-up has an identifier unique to the HBA 615 set as the interface identifier of the HBA 615. The server 60 that has completed the boot-up has the identifier rewriting program 620 executed thereon, and waits for a command to change the identifier to be received from the management server 10.

Figure 3:
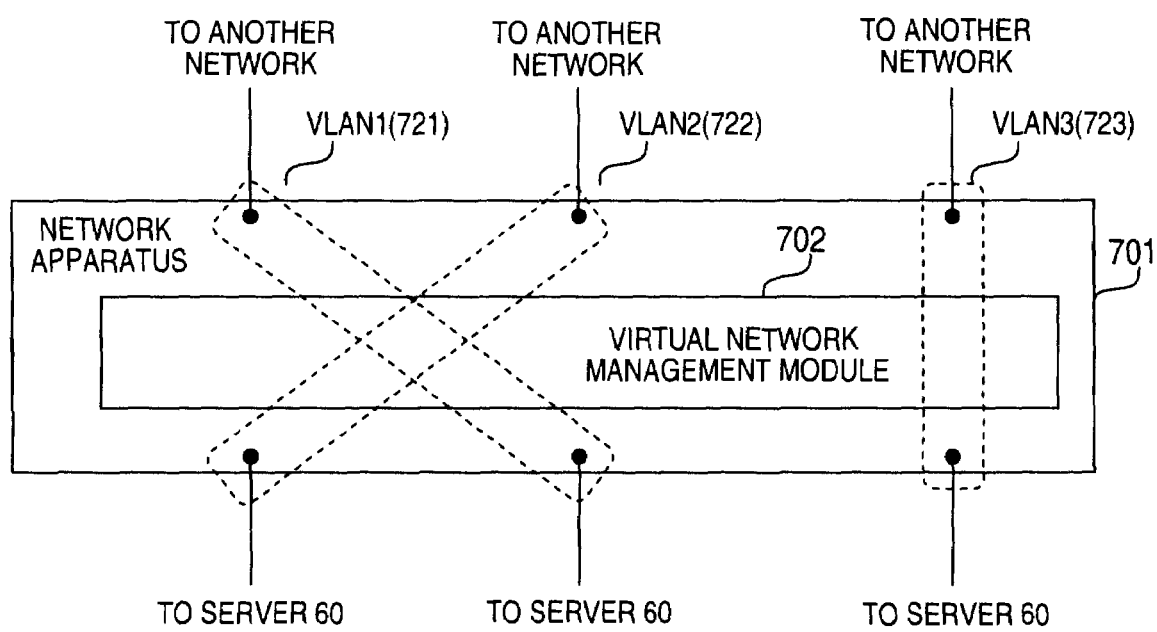
FIG. 3 is a block diagram illustrating a configuration of the network.

FIG. 3 is a block diagram illustrating a configuration of the network 70. The network 70 includes a network apparatus 701, and the network apparatus 701 includes a virtual network management module 702. The virtual network management module 702 manages a configuration of a virtual network. Here, the virtual network is specifically a virtual local area network (VLAN), and particularly in this embodiment, a MAC-based VLAN. FIG. 3 illustrates an example in which virtual networks VLAN 1 (721), VLAN 2 (722), and VLAN 3 (723) are configured between the servers 60 coupled to the network apparatus 701 and other networks.

The virtual network management module 702 has a communication path preset by the network management server 170 of FIG. 1, and holds a VLAN identifier corresponding to the MAC address. Therefore, the identifier rewriting program 620 can select the communication path to a desired VLAN identifier by changing the MAC address of the NIC 616 in response to the command received from the management server 10, and can select the network 70, the server 60, or the like of a connection destination corresponding to a purpose of the server 60.

Figure 4:
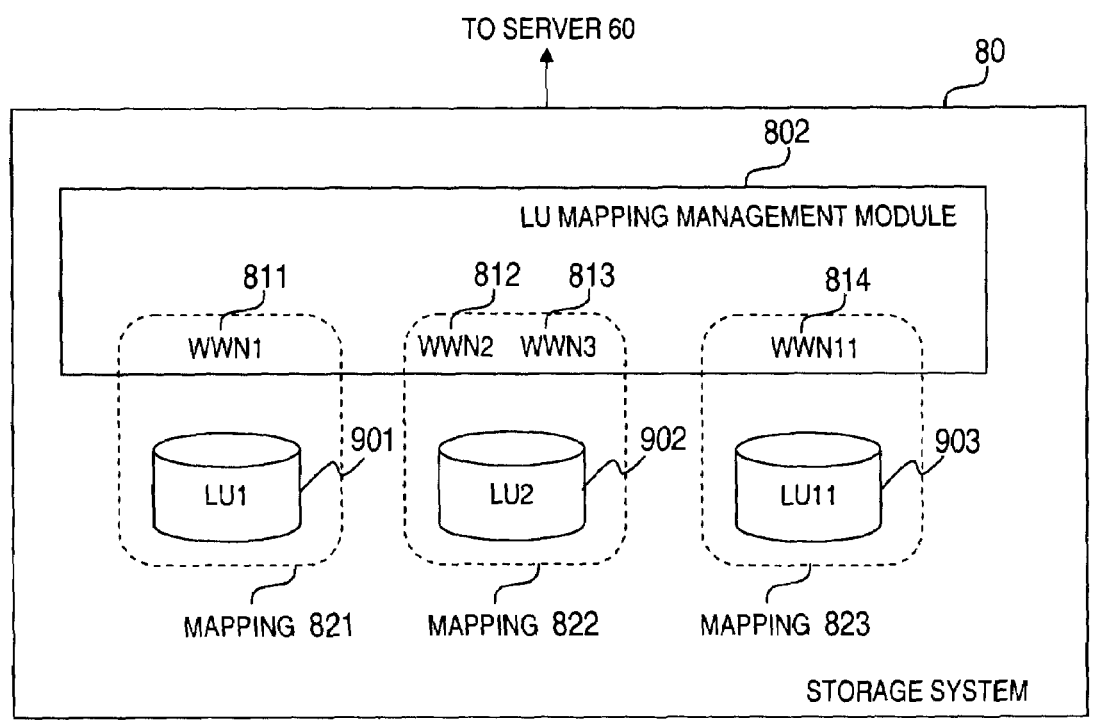
FIG. 4 is a block diagram illustrating a configuration of the storage system.

FIG. 4 is a block diagram illustrating a configuration of the storage system 80. The storage system 80 includes an LU mapping management module 802 and at least one LU 90. In FIG. 4, as an example of the LUs 90, the storage system 80 includes LU 1 (901), LU 2 (902), and LU 11 (903). The LU mapping management module 802 manages mappings between the LUs 90 and the storage interface identifiers. By mapping the LUs 90 and the storage interface identifiers, a given LU 90 can be accessed by only the HBA 615 holding the storage interface identifier mapped with the given LU 90. FIG. 4 illustrates an example of using a mapping 821 to thereby perform mapping between WWN 1 (811) and LU 1(901). It should be noted that as illustrated by a mapping 822, a plurality of WWNs can be mapped. In a similar manner, a plurality of LUs 90 can be mapped.

The LU mapping management module 802 has an access path preset by the storage management server 180 of FIG. 1, and holds the access path (route from the HBA 615 to the LU 90) corresponding to the WWN. Therefore, the identifier rewriting program 620 can select a desired LU 90 to be accessed by the server 60 by changing the WWN of the HBA 615 of the server 60 in response to the command received from the management server 10, and can be coupled to the LU 90 corresponding to a purpose of the server 60.

FIG. 5 illustrates an example of the identifier pool table 31. The identifier pool table 31 holds the list of the interface identifiers of the network 70 and the storage system 80, which are previously pooled. In other words, the identifier pool table 31 stores the interface identifiers set as connection destinations of the network 70 (network apparatus 701) and the storage system 80 that serve as the external apparatuses for the server 60. The interface identifier is specifically the MAC address held by the NIC 616 of the server 60 or the WWN held by the HBA 615 thereof. A column 311 indicates a class of the interface identifier. In other words, a type of the I/O interface included in the server 60 is stored in the column 311. It should be noted that a column 312 indicates the interface identifier. The column 311 specifically indicates a "network" if the interface identifier of the column 312 is a MAC address, and a "storage" if a WWN. A column 313 indicates whether the interface identifier of the column 312 is in use or pooled (in a pooled state).

FIG. 6 illustrates an example of the server pool table 32. A column 321 indicates an identifier for identifying the server 60. The column 321 specifically indicates a universally unique identifier (UUID), a serial number, a number of an installation slot or a chassis of a blade in a case of a blade server, or a name defined by the user (or server administrator). A column 322 indicates whether the server 60 indicated by the column 321 is in use or in a pooled (not-in-use) state. A column 323 indicates the specification information on the server 60 indicated by the column 321. The column 323 specifically indicates an architecture (type, clock frequency, and number of cores) of an installed CPU, a capacity of an installed memory, a type and the number of installed NICs, and a type and the number of installed HBAs. In FIG. 6, specifications of "Server 1" indicated by the column 321 indicate that the type, the clock frequency, and the number of cores of the CPU are "Xeon", "3.0 GHz", and "2", respectively, the capacity of the installed memory is "4 GB", and one NIC and one HBA are installed. In addition, a column 325 stores an identifier of a group to which the user belongs.

As described above, the server pool table 32 stores information regarding resources (computing capabilities and storage capacity) of the server 60 subjected to management by the management server 10.

FIG. 7 illustrates an example of the network pool table 33. A column 331 indicates the network interface identifier. The column 331 specifically indicates the MAC address. A column 332 indicates whether the network interface identifier indicated by the column 331 is in use or in a pooled (not-in-use) state. A column 333 indicates the network 70 to which the network interface identifier indicated by the column 331 belongs. The column 333 specifically indicates information for identifying the network apparatus such as a network switch. A column 334 indicates the virtual network to which the network apparatus identified by the network interface identifier indicated by the column 331 is coupled. A column 335 stores an identifier of the group to which the user who uses the server 60 belongs.

FIG. 8 illustrates an example of the storage pool table 34. A column 341 indicates the storage interface identifier. The column 341 specifically indicates the WWN. A column 342 indicates whether the storage interface identifier indicated by the column 341 is in use or in a pooled (not-in-use) state. A column 343 indicates the storage to which the storage interface identifier indicated by the column 341 belongs. The column 343 specifically indicates information for identifying the storage system 80. A column 344 indicates an identifier of the LU mapped with the storage interface identifier indicated by the column 341. A column 345 indicates a capacity of the LU indicated by the column 344. A column 346 indicates attribute information on the storage interface identifier indicated by the column 341. The attribute information specifically represents a function or restrictions regarding use of the corresponding storage system 80. Examples of the attribute information include, as illustrated in FIG. 8, "for Windows" or "for Linux" if the corresponding storage system 80 is suitable for being used for a specific OS such as Windows (registered trademark) or Linux, and "for cluster" if the corresponding storage system 80 is suitable for tasks for a high-availability (HA) cluster. A column 347 stores information indicating whether or not the corresponding LU 90 is sharable. In FIG. 8, the case where the corresponding LU 90 is sharable is indicated as "○". A column 348 stores the identifier of the group to which the user belongs.

The user (or server administrator) can select the storage interface identifier (WWN) from the storage pool table 34 in correspondence with a type of the OS executed on the server 60 or data therefor, and by having the configuration management program 20 change the interface identifier of the HBA 615, can couple the server 60 to a desired LU 90, which makes it possible to execute a desired OS on an arbitrary server 60.

Hereinafter, description is made of an example of an operation of the configuration management program 20 executed on the management server 10 according to this embodiment.

Figure 10:
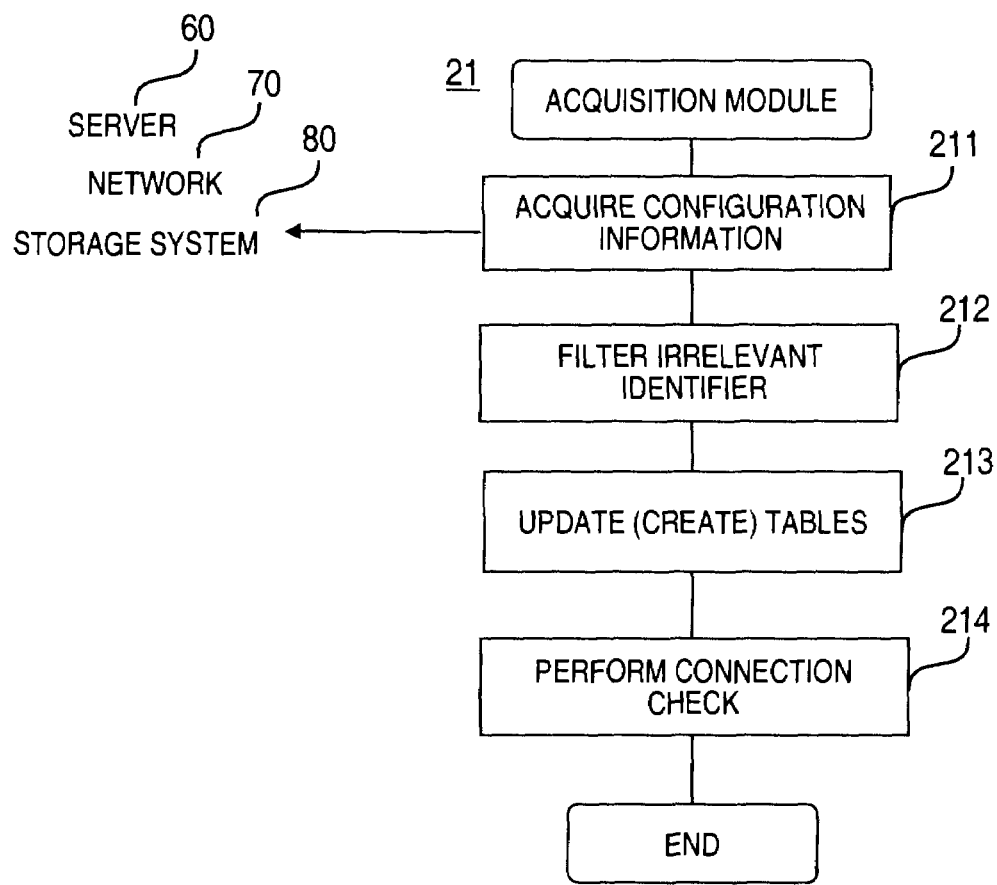
FIG. 10 illustrates a flowchart of a processing performed by the acquisition module of the configuration management program.

FIG. 10 illustrates a flowchart of a processing performed by the acquisition module 21 of the configuration management program 20. The acquisition module 21 is executed at a predetermined cycle or in response to an instruction received from an administrator, and acquires configuration information on the computer system (Step 211). The configuration information acquired here represents information for creating and updating the server pool table 32, the network pool table 33, and the storage pool table 34. Examples of a method of acquiring the information include a method of acquiring the information from a device (not shown) that holds the configuration information on the server 60, the virtual network management module 702 of the network apparatus, a device (network management server 170) that holds the configuration information on the network 70, the LU mapping management module 802 of the storage system 80, a device (storage management server 180) that holds the configuration information on the storage system 80, software that manages the configuration information on the computer system, and the like, by using an application program interface (API) or a command line interface (CLI) provided by the above-mentioned components, a method of acquiring the information by being input by the user, and a method of acquiring the information through a file.

In particular, the network 70 or the storage system 80 cannot be accessed directly by the management server 10, and hence, in a case where the network management server 170 and the storage management server 180 are coupled to the management network 51, the configuration information on the network 70 and the configuration information on the storage system 80 may be acquired from those management servers. On the other hand, in a case where the network management server 170 or the storage management server 180 cannot be accessed from the management server 10, the configuration information on the network 70 and the configuration information on the storage system 80 are acquired by causing the configuration information from each of the management servers to be stored into a file and causing the management server 10 to read the file. It should be noted that each of the servers 60 can make direct access from the management server 10 via the management network 51, and hence the management server 10 may serve as the above-mentioned device that holds the configuration information on the server 60.

Subsequently, information that does not exist in the list of the interface identifiers of the network 70 and the storage system 80 held in the identifier pool table 31 is filtered from the acquired information (Step 212). In other words, the filtering is performed to cause only an apparatus or a device subjected to management by the configuration management program 20 of the management server 10 to be extracted from the plurality of networks 70 and the plurality of storage systems 80 within the computer system. Then, the information subjected to the filtering is used to create and update the server pool table 32, the network pool table 33, and the storage pool table 34 (Step 213).

Subsequently, a connection check is performed on the networks 70 and the storage systems 80 held in the network pool table 33 and the storage pool table 34, respectively (Step 214). The management server 10 cannot directly access the network 70 or the storage system 80, and hence the management server 10 requests the server 60 for a connection check. The connection check with respect to the network 70 is, for example, a processing of sending and receiving a packet such as a ping to/from a specific VLAN to check how far the packet travels toward the network 70. In addition, the connection check with respect to the storage system 80 is, for example, a processing of accessing the LU 90 of the storage system 80 to check the capacity of the LU 90 or whether or not there is data held therein. It should be noted that if there is data held by the LU 90, the user can select between automatically erasing the data (performing a processing such as formatting) in Step 214 and leaving the data as it is.

By the above-mentioned processing, the acquisition module 21 of the configuration management program 20 updates the server pool table 32, the network pool table 33, and the storage pool table 34.

Figure 11:
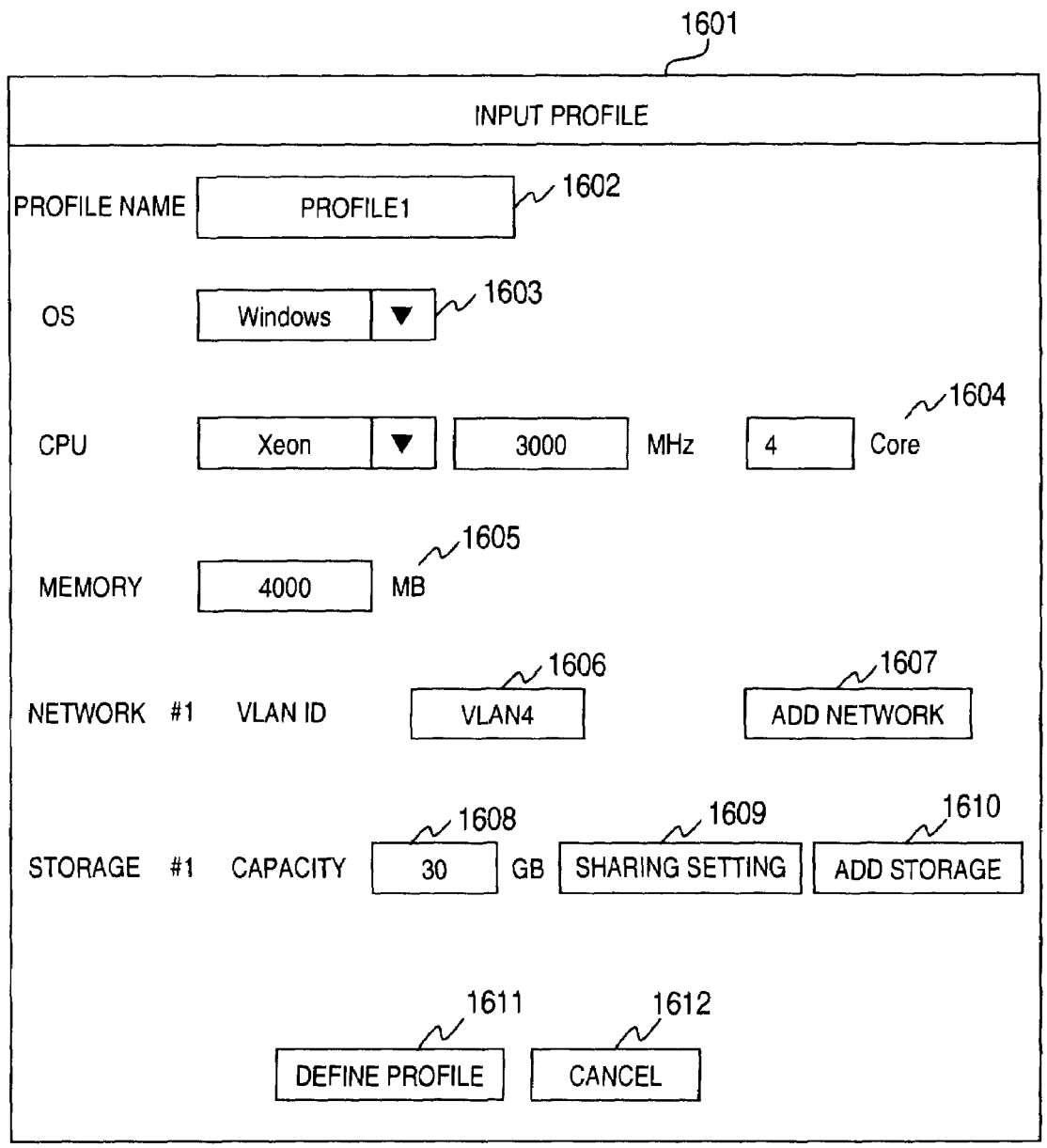
FIG. 11 illustrates an example of a graphical user interface (GUI) as an example of a user interface (UI) provided by the configuration management program to the user for input of the profile or an update of the profile.

FIG. 11 illustrates an example of a graphical user interface (GUI) as an example of a user interface (UI) provided by the configuration management program 20 to the user for input of the profile or an update of the profile. The GUI is displayed on the output device 16 coupled to the management server 10 or a display device or the like of another terminal coupled to the management server 10 via the management network 51 by using a browser or a dedicated program with text or other such data.

The user (or server administrator) sets the requirements (profile) for the server 60 necessary for the computer system through the UI.

A window 1601 represents a window of a browser or a program. The window 1601 displays information indications of the profile and buttons and the like used for operation. The user inputs a profile name in an input field 1602 for a profile name. An OS selection field 1603 allows selection of the type of the OS to be run. In the example of FIG. 11, the selection is made possible by a pull-down menu. A CPU input field 1604 allows input of the type, the clock frequency, and the number of cores of the CPU. A memory input field 1605 allows input of the capacity of the memory. A network input field 1606 allows input of the virtual network to be coupled. It should be noted that clicking an "add network" button 1607 can increase the number of networks 70 to be coupled, which increases the number of rows of the network input field 1606. A storage input field 1608 allows input of the capacity of the storage system 80 to be coupled. It should be noted that clicking an "add storage" button 1610 for the storage system 80 can increase the number of storage systems 80 to be coupled, which increases the number of rows of the storage input field 1608. To complete inputting and updating the profile, a "define profile" button 1611 is clicked on, and a "cancel" button 1612 is clicked on to cancel the inputting and updating.

The profile for the server 60 set through the above-mentioned UI is stored in the profile DB 40 of the management server 10.

FIG. 12 illustrates an example of information (profile) held in the profile DB 40. A column 401 holds a name of the profile. A column 402 holds the type of the OS corresponding to the profile (profile indicated by the column 401). The column 402 specifically indicates a name and version information of the OS. A column 403 indicates the specification information. The column 403 specifically indicates the type, the clock frequency, and the number of cores of the CPU, the capacity of the memory, the virtual network of the connection destination, and the storage capacity of the connection destination. A column 404 indicates an identifier of the server 60 on which the corresponding profile is deployed. A case where the corresponding profile is not deployed (operated) on the server 60 is indicated as "undeployed". Columns 405 and 406 indicate information held only when the corresponding profile is deployed on the server 60. The column 405 indicates the determined network interface identifier. The column 406 indicates the determined storage interface identifier. The columns 405 and 406 specifically indicate that the interface identifiers (MAC address and WWN, respectively) are applied as the MAC address of the NIC 616 installed on the server 60 indicated by the column 404 and the WWN of the HBA 615 installed thereon, respectively.

Figure 13:
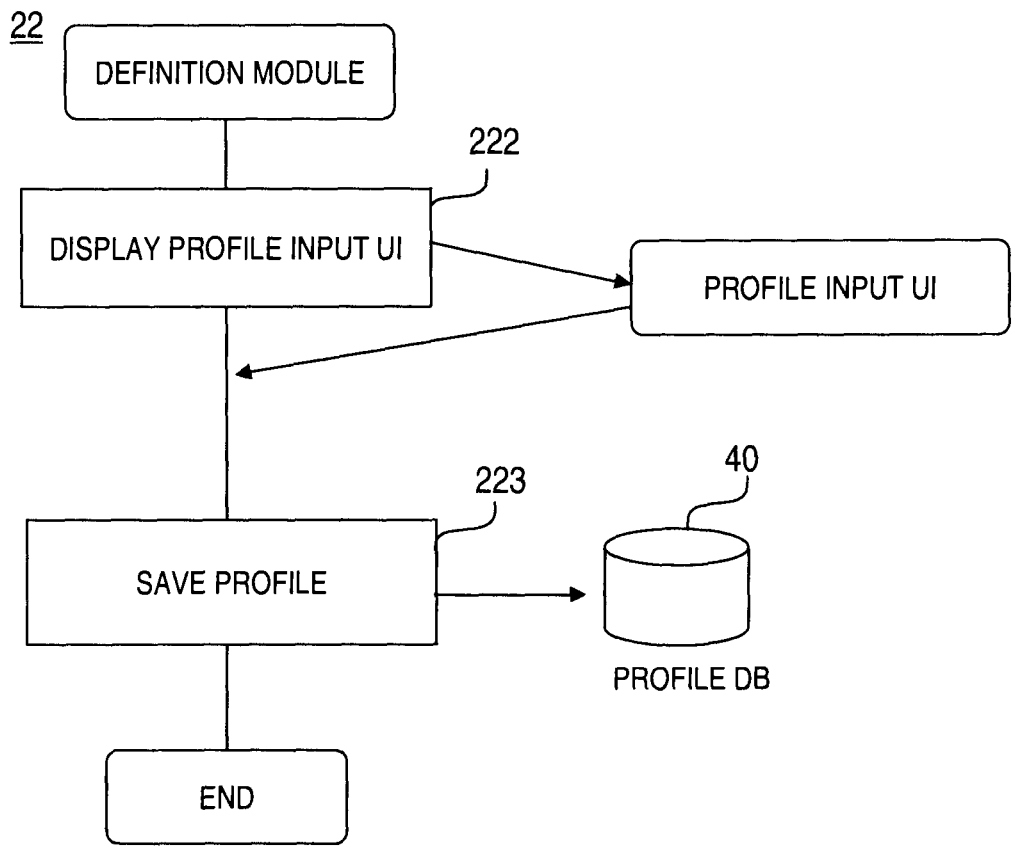
FIG. 13 is a flowchart illustrating an example of a processing performed by the definition module of the configuration management program.

FIG. 13 is a flowchart illustrating an example of a processing performed by the definition module 22 of the configuration management program 20. The definition module 22 is executed in response to an instruction received from the user, and displays a profile input UI as described above with reference to FIG. 11 (Step 222). FIG. 11 exemplifies contents of the UI displayed in Step 222. After the user completes the input through the profile input UI, the input contents of the profile are saved into the profile DB 40 (Step 223).

Figure 14:
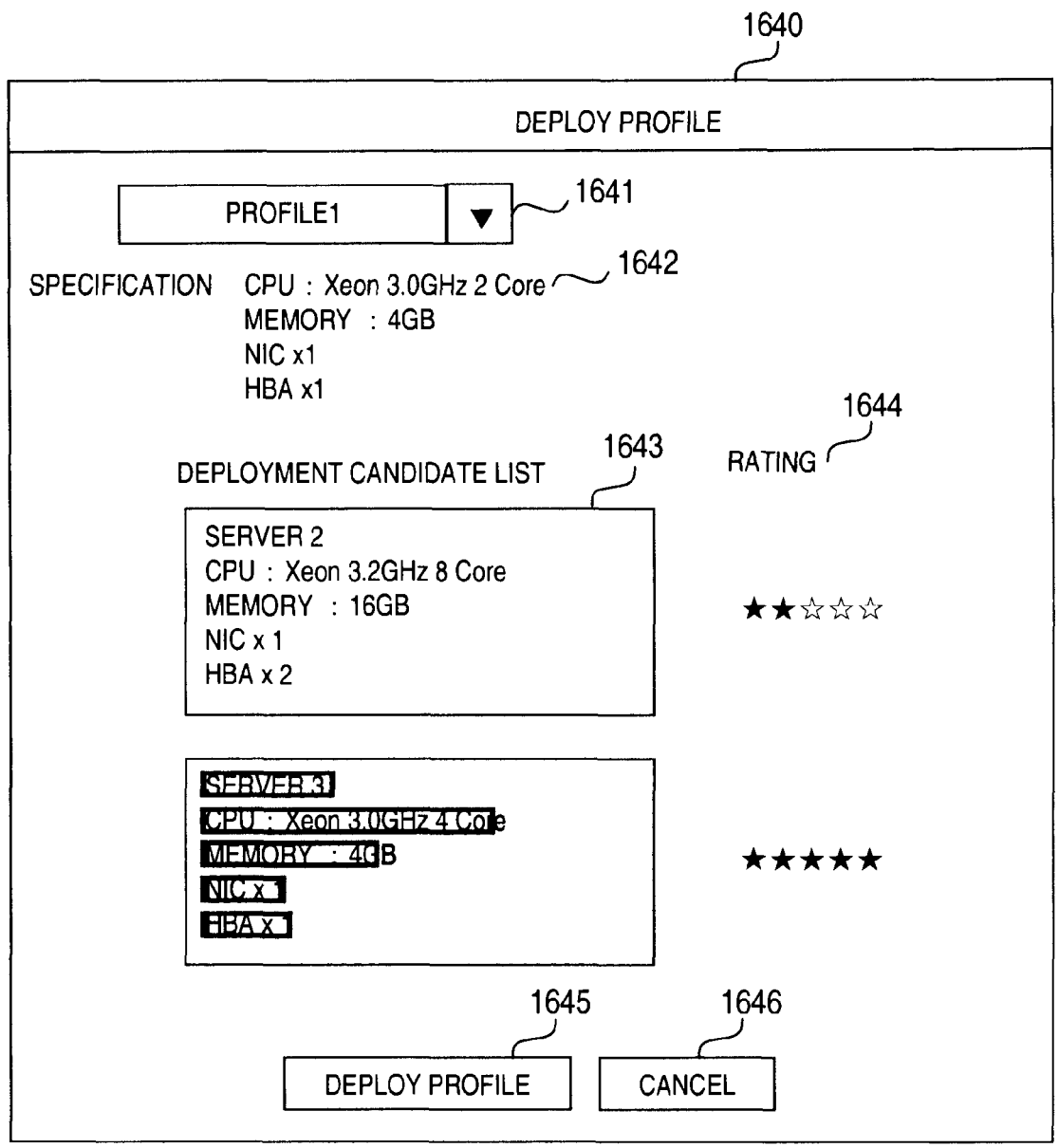
FIG. 14 illustrates an example of a graphical user interface (GUI) as an example of a user interface (UI) provided by the configuration management program to the user for selection of the server.

FIG. 14 illustrates an example of a graphical user interface (GUI) as an example of a user interface (UI) provided by the configuration management program 20 to the user for selection of the server 60 to be a deployment destination of the profile. The GUI is displayed on the output device 16 coupled to the management server 10 or a display device or the like of another terminal coupled to the management server 10 via the network 70 by using a browser or a dedicated program with text or other such data. A window 1640 represents a window of a browser or a program.

The window 1640 displays a list of candidates for the server 60 onto which the profile is to be deployed and buttons and the like used for operation. The user selects the profile to be deployed through a profile selection field 1641. In the example of FIG. 14, the selection is made possible by a pull-down menu. When the profile is selected, specification information defined by the profile is displayed in a specification field 1642. To be specific, in the specification field 1642, the type, the clock frequency, and the number of cores of the CPU, the memory capacity, the number of coupled networks, and the number of coupled storages are displayed. In a deployment candidate list field 1643, as a server candidate list for a deployment destination, a list of the servers 60 to be candidates for the deployment destination and specification information thereof are displayed. In a rating field 1644, guide information to be referenced by the user when selecting a deployment destination server is displayed. In the example of FIG. 14, five stars are used to display the guide information on a 1-to-5 scale. When the server 60 displayed in the deployment candidate list field 1643 is clicked on, as illustrated as a hatched portion in FIG. 14, the corresponding server 60 is selected as the deployment destination of the profile. When a "deploy profile" button 1645 is clicked on with the server 60 being selected, the profile is deployed onto the corresponding server 60. To cancel the deployment, a "cancel" button 1646 is clicked on.

Figure 15:
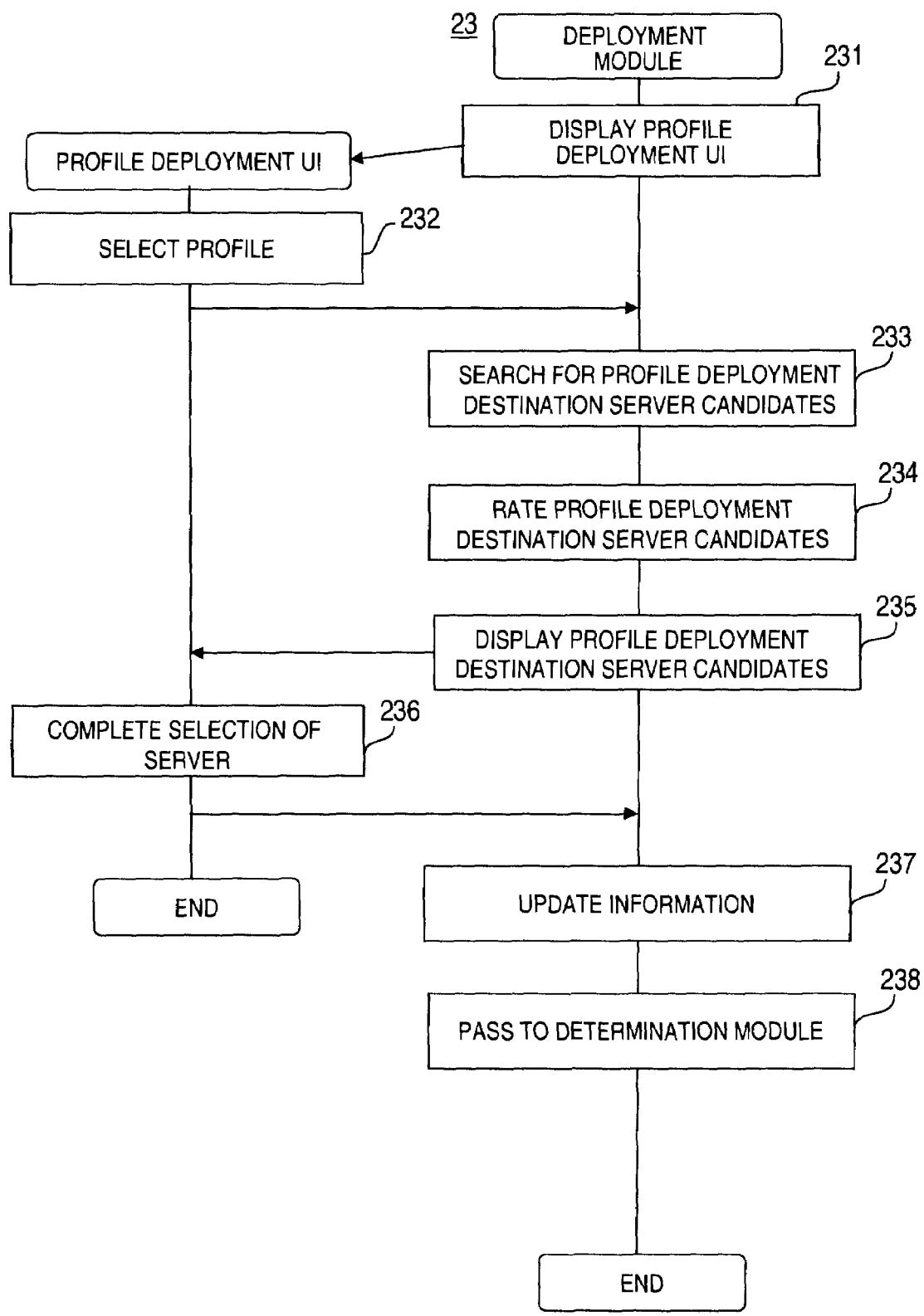
FIG. 15 is a flowchart of a processing performed by the deployment module of the configuration management program.

FIG. 15 is a flowchart of a processing performed by the deployment module 23 of the configuration management program 20. The deployment module 23 is executed based on an instruction received from the user, and displays a profile deployment UI (Step 231). FIG. 14 exemplifies contents of the UI displayed in Step 231. When the user selects the profile to be deployed through the profile deployment UI (Step 232), the deployment module 23 searches for candidates for the server 60 of the deployment destination of the selected profile (Step 233). Here, the specification information (performance information) of the profile selected through the UI of FIG. 14 is used for a search through the servers 60, and the deployment module 23 lists the servers 60 in a pooled state (with the profile being undeployed), which satisfy the specification information of the profile, from among the servers 60 within the server pool table 32. Here, satisfying the specification information specifically represents that the type of the CPU specified through the UI of FIG. 14 is the same, and that the clock frequency and the number of cores of the CPU, the memory capacity, and the number of ports of the NIC 616 and the HBA 615 satisfy the following condition.

$$(\text{value of specification information of the profile}) \leq (\text{value of specification information on the server } 60) \quad (\text{Expression 1})$$

The deployment module 23 extracts, as candidates for the deployment destination of the profile, the servers 60 in a pooled state with each of the values of the clock frequency and the number of cores of the CPU, the memory capacity, and the number of ports of the NIC 616 and the HBA 615 satisfying Expression 1 described above.

Subsequently, the deployment module 23 rates the candidates for the deployment destination server listed in Step 233 described above (Step 234). Results of the rating are output as information displayed in the rating field 1644 illustrated in FIG. 14. Here, to be specific, the rating is performed by the deployment module 23 so as to increase the number of stars if the values of the specification information of the profile to be compared in Expression 1 described above are closer to the values of the specification information on the server 60 on the whole and to decrease the number of stars if there is a larger difference therebetween.

It should be noted that the server 60 that does not satisfy Expression 1 described above may be left as a candidate in Step 233 to be rated as zero stars in Step 234. Then, the servers 60 listed in Step 233 and the rating results of the respective servers 60 obtained in Step 234 are displayed on the profile deployment UI (Step 235).

Accordingly, as illustrated in FIG. 14, the profile deployment UI displays the server list indicated in the deployment candidate list field 1643 and the rating field 1644 for the respective servers 60. When the user operates the UI of FIG. 14 to complete the selection of the server 60 of the deployment destination of the profile (Step 236), the deployment module 23 updates the states of the selected server 60 and the profile. To be specific, the deployment module 23 updates the state of the server 60 selected in Step 236, which is indicated by the column 322 in the server pool table 32, to "in use", and updates the deployment server on which the profile is deployed, which is indicated by the column 404 in the profile DB 40, so as to hold the identifier of the selected server 60.

Subsequently, the deployment module 23 calls the determination module 24 to pass the deployed profile and the selected server 60 to the determination module 24 (Step 238).

Figure 16:
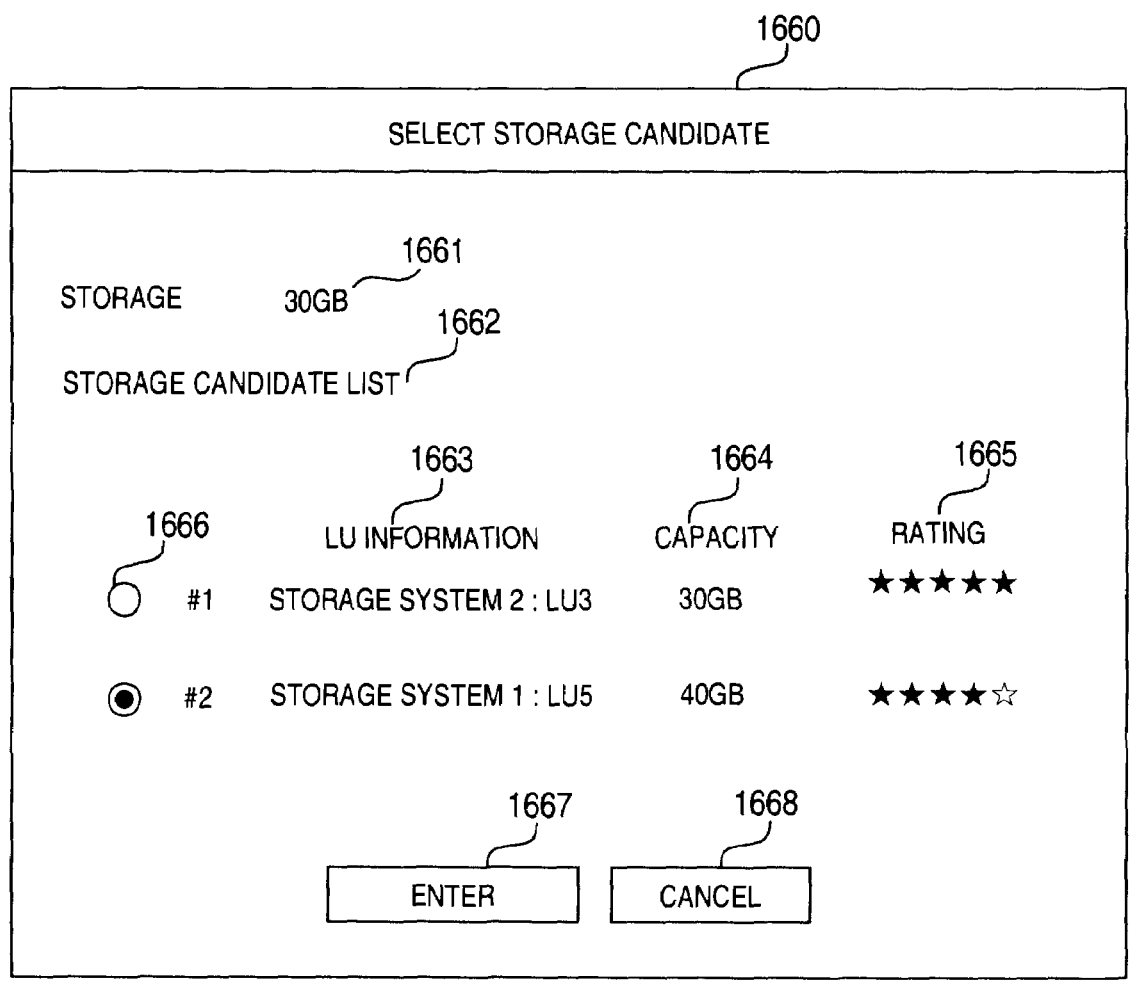
FIG. 16 illustrates an example of a graphical user interface (GUI) as an example of a user interface (UI) provided by the configuration management program to the user for selection of a candidate for the storage system.

FIG. 16 illustrates an example of a graphical user interface (GUI) as an example of a user interface (UI) provided by the configuration management program 20 to the user for selection of a candidate for the storage system 80. The GUI is displayed on the output device 16 coupled to the management server 10 or a display device or the like of another terminal coupled to the management server 10 via the network 70 by using a browser or a dedicated program with text or other such data. A window 1660 represents a window of a browser or a program. In the window 1660, a list of storage candidates and buttons and the like used for operation are displayed. In a storage information field 1661, the capacity of the desired storage system 80 is displayed. In a storage candidate list field 1662, the form of a list of the storage systems 80 to be candidates, LU information 1663, a capacity 1664, and a rating 1665 of each of the storage systems 80 are displayed. As the LU information 1663, a storage system identifier and an LU number of the corresponding storage system 80 are displayed. As the capacity 1664, the capacity of the corresponding storage system 80 is displayed. As the rating 1665, guide information to be referenced by the user when selecting the deployment destination server 60 is displayed. In the example of FIG. 16, five stars are used to display the guide information on a 1-to-5 scale. The user clicks on a button 1666 to select the storage system 80. The selected button 1666 is displayed as a double circle in the example of FIG. 16. When an "enter" button 1667 is clicked on with the storage system 80 being selected, the selection of the storage system 80 is determined. To cancel the selection, a "cancel" button 1668 is clicked on.

Figure 17:
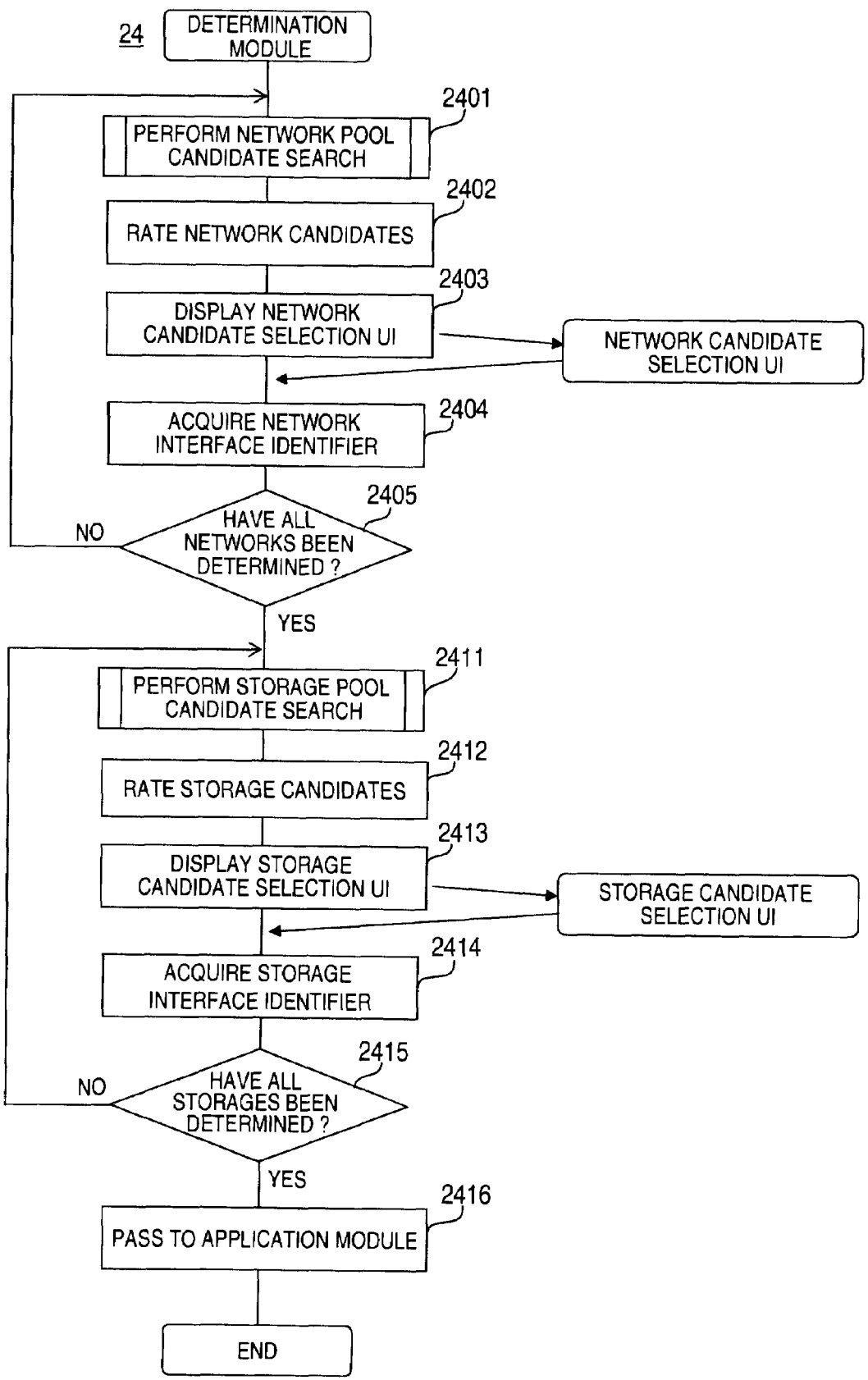
FIG. 17 is a flowchart of a processing performed by the determination module of the configuration management program.
Figure 18:
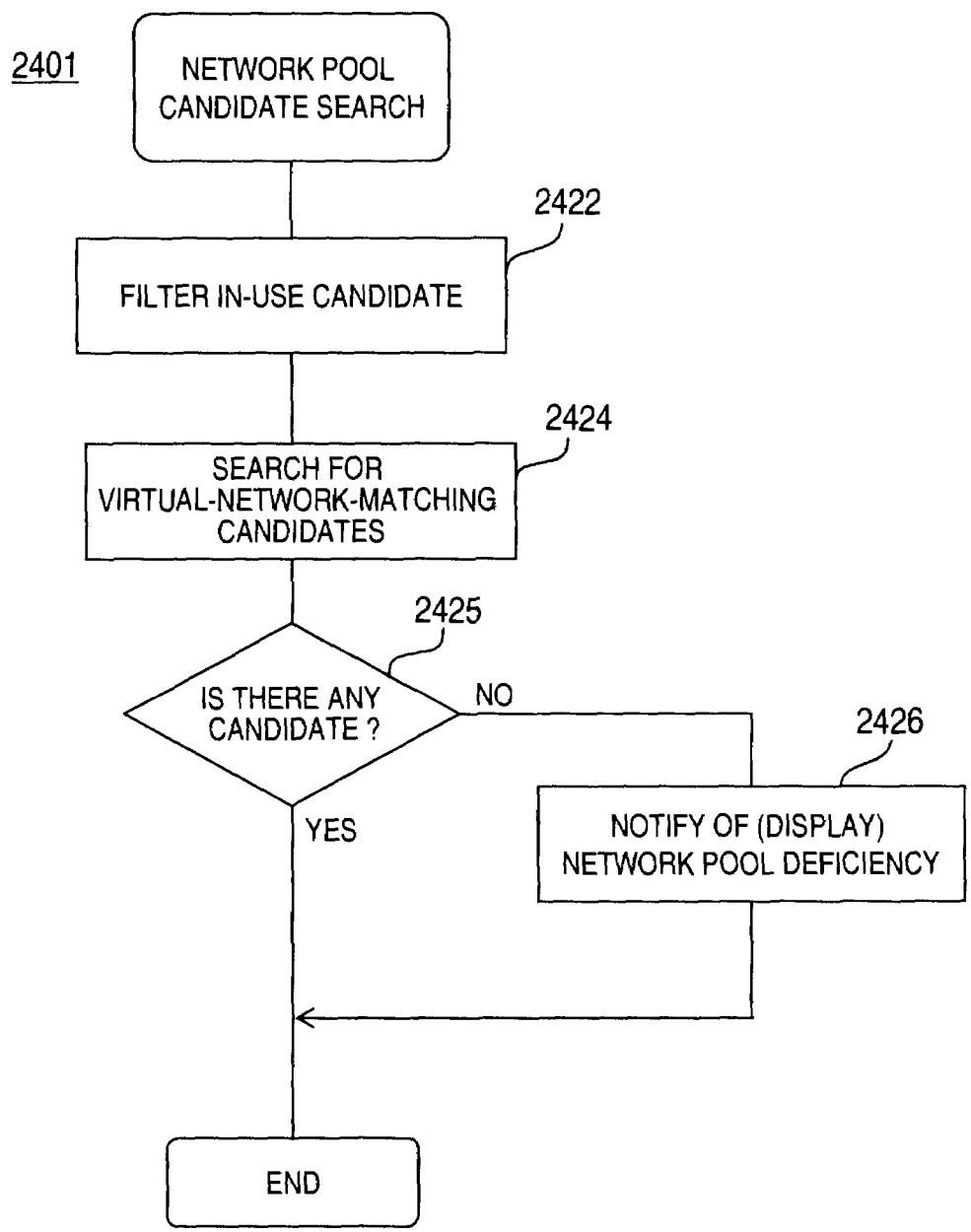
FIG. 18 is a detailed flowchart of a processing of listing candidates for the network 70, which is performed in Step 2401 of FIG. 17.

FIG. 17 is a flowchart of a processing performed by the determination module 24 of the configuration management program 20. The determination module 24 uses the deployed profile and the information on the server 60 selected in Step 236 described above, which have been acquired from the deployment module 23, to list candidates for the network 70 from the network pool table 33 (Step 2401). FIG. 18 is used to describe a processing flow of Step 2401 in detail. Then, the determination module 24 rates the candidates for the network 70 (Step 2402). Here, to be specific, the rating of the network 70 is performed so as to increase the number of stars for higher performance (transmission speed) of the network 70 and to increase the number of stars for a larger number of added values such as a quality of service (QoS).

Subsequently, the determination module 24 displays a network candidate selection UI (Step 2403). The network candidate selection UI represents a UI for selecting candidates for the network 70 in a similar manner to the UI for selecting the storage system 80 illustrated in FIG. 16, and hence illustration thereof is omitted because of being similar to FIG. 16. The network candidate selection UI specifically represents a UI that displays a connection destination virtual network number of the network 70 requested in the profile, a list of candidates for the network 70, the network apparatuses configuring the corresponding network 70, performance and QoS setting of the corresponding network 70, and the rating of the corresponding network 70 indicated in Step 2402, to allow the user to select the network 70 from those candidates.

When the user completes the selection of a network through the network candidate selection UI, the determination module 24 acquires the network interface identifier corresponding to the selected network 70 (Step 2404). To be specific, the determination module 24 acquires the network interface identifier corresponding to the selected network 70 from the network pool table 33, updates the state of the corresponding network interface identifier, which is indicated by the column 332 in the network pool table 33, to "in use", and updates an in-use flag of the corresponding network interface identifier, which is indicated by the column 313 in the identifier pool table 31, to "in use". Further, the determination module 24 adds the acquired network interface identifier to the network indicated by the column 405 in the profile DB 40. Subsequently, the determination module 24 checks whether or not the network interface identifiers of all of the networks 70 included in the deployed profile have been acquired (Step 2405). If Yes, the procedure advances to Step 2411, and if No, the procedure returns to Step 2401.

Figure 19:
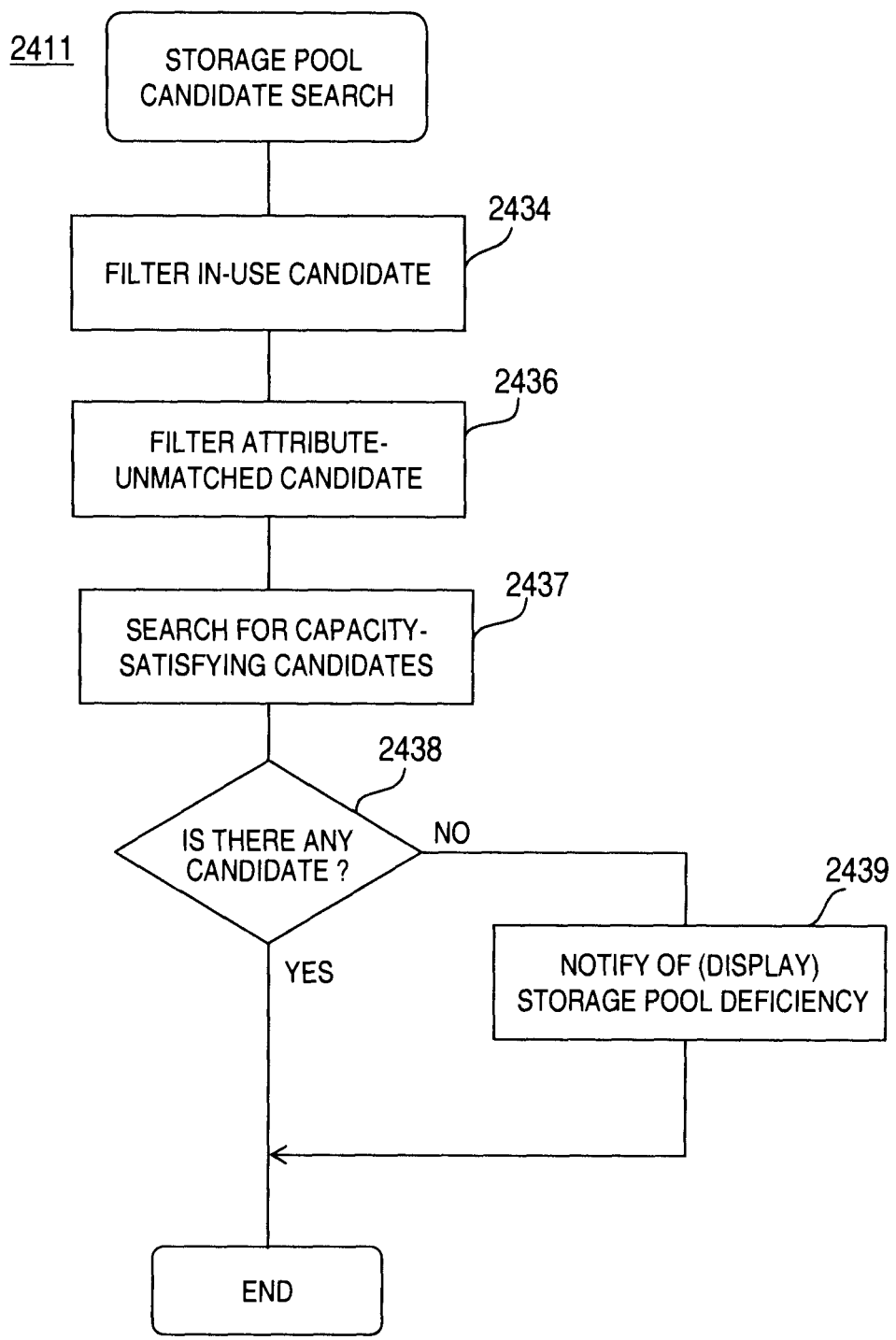
FIG. 19 is a detailed flowchart of a processing of listing storage candidates, which is performed in Step 2411 of FIG. 17.

Subsequently, the determination module 24 uses the deployed profile and the information on the selected server 60, which have been acquired from the deployment module 23, to list storage candidates from the storage pool table 34 (Step 2411). FIG. 19 is used to describe a processing flow of Step 2411 in detail. Then, the determination module 24 rates the storage candidates (Step 2412). Here, to be specific, the rating of the candidates for the storage system 80 is performed so as to increase the number of stars if the capacity of the storage system 80 within the specification information of the profile is closer to the capacity of the storage candidate and to decrease the number of stars if there is a larger difference therebetween. Subsequently, the determination module 24 displays a storage candidate selection UI (Step 2413). FIG. 16 exemplifies contents of the UI displayed by the determination module 24 in Step 2413. When the user completes selecting the storage system 80 from among the candidates displayed on the storage candidate selection UI, the determination module 24 acquires the storage interface identifier corresponding to the selected storage system 80 (Step 2414). To be specific, the determination module 24 acquires the storage interface identifier corresponding to the storage system 80 selected through the UI of FIG. 16 from the storage pool table 34, updates the state of the corresponding storage interface identifier, which is indicated by the column 342 in the storage pool table 34, to "in use", and updates the in-use flag of the corresponding storage interface identifier, which is indicated by the column 313 in the identifier pool table 31, to "in use". Further, the determination module 24 adds the acquired storage interface identifier to the storage indicated by the column 406 in the profile DB 40.

Subsequently, the determination module 24 checks whether or not the storage interface identifiers of all of the storage systems 80 included in the profile deployed on the set server 60 have been acquired (Step 2415). If Yes, the procedure advances to Step 2416, and if No, the procedure returns to Step 2411. In Step 2416, the determination module 24 calls the application module 25 to pass the identifier of the server 60 on which the profile is deployed, the list of the acquired network interface identifiers, and the list of the acquired storage interface identifiers, to the application module 25.

FIG. 18 is a detailed flowchart of a processing of listing candidates for the network 70, which is performed in Step 2401 of FIG. 17. In Step 2422, the determination module 24 filters (removes) the network 70 being in use from the network pool table 33. To be specific, the determination module 24 leaves the network 70 with "pooled" as the state of the column 332 in the network pool table 33, and removes the network 70 with "in use". Subsequently, in Step 2424, the determination module 24 searches for unfiltered candidates for the network 70 which satisfy the specifications of the network 70 included in the profile deployed on the server 60. To be specific, the determination module 24 lists the network interface identifiers (MAC addresses) of the networks that can be coupled to the virtual network (VLAN number) to be coupled which is defined in the deployed profile, by searching therefor from the network pool table 33. In Step 2425, the determination module 24 checks whether or not there is any candidate for the network 70 in Step 2424. If Yes, the procedure is brought to an end, and if No, the determination module 24 notifies the user of deficiency of a network pool (Step 2426). To be specific, the notification is performed by being displayed on the UI or the like. It should be noted that in Step 2426, the determination module 24 may wait until a processing of increasing the pool of the networks 70 is performed, or may call another program in order to automatically perform the processing of increasing the pool of the networks 70.

FIG. 19 is a detailed flowchart of a processing of listing storage candidates, which is performed in Step 2411 of FIG. 17. In Step 2434, the determination module 24 filters (removes) the storage system 80 being in use from the storage pool table 34. To be specific, the determination module 24 leaves the storage system 80 with "pooled" as the state of the column 342 in the storage pool table 34, and removes the storage system 80 with "in use". Subsequently, in Step 2436, the determination module 24 filters (removes) the storage system 80 that does not conform to an attribute of the storage system 80. Here, the determination module 24 uses information held as the attribute information indicated by the column 346 in the storage pool table 34 to filter the storage system 80 that does not have the same attribute information in definitions of the deployed profile. For example, if the OS is defined as "Windows" (registered trademark) in the profile, the storage system 80 whose attribute information is "for OS:Linux" is filtered (removed).

Subsequently, in Step 2437, the determination module 24 searches for unfiltered storage candidates that satisfy the capacity of the storage system 80 defined in the deployed profile to list such storage candidates. Here, satisfying the capacity (specification) represents satisfying the following condition.

(storage capacity of the profile)≤(storage capacity of
the storage pool table 34) (Expression 2)

In Step 2438, the determination module 24 checks whether or not there is any storage candidate found in Step 2437. If Yes, the procedure is brought to an end, and if No, the determination module 24 notifies the user of deficiency of a storage pool (Step 2439). To be specific, the notification is performed by being displayed on the UI or the like. It should be noted that in Step 2439, the determination module 24 may wait until a processing of increasing the pool of the storage systems 80 is performed, or may call another program in order to automatically perform the processing of increasing the pool of the storage systems 80.

Figure 20:
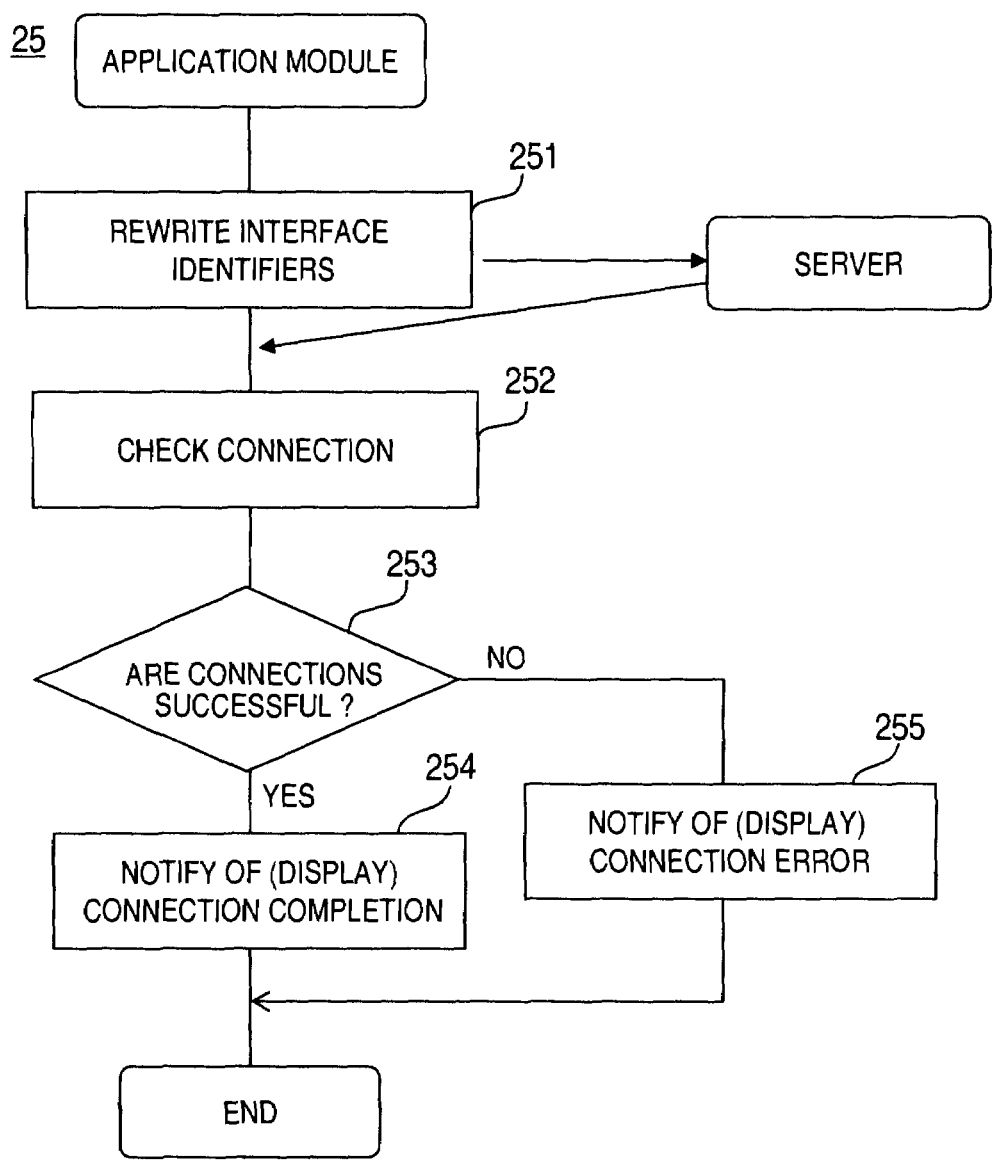
FIG. 20 is a flowchart of a processing performed by the application module of the configuration management program.

FIG. 20 is a flowchart of a processing performed by the application module 25 of the configuration management program 20. The application module 25 acquires, from the determination module 24, the interface identifiers of the I/O interfaces (NIC 616 and HBA 615) coupled to external apparatuses or devices, and instructs the server 60 to be the deployment destination of the profile to rewrite the interface identifiers of the I/O interfaces (Step 251). Here, the identifier rewriting program 620 of the server 60 illustrated in FIG. 2 receives an instruction from the application module 25, and rewrites the network interface identifier of the NIC 616 of the server 60 and the storage interface identifier of the HBA 615 thereof. It should be noted that the identifier rewriting program 620 may be delivered to the server 60 by the application module 25 upon execution of Step 251. Examples of a delivery method include a method of performing delivery by network boot such as PXE boot.

When the identifier rewriting program 620 of the server 60 completes rewriting the interface identifiers of the I/O interfaces, it is checked whether or not the server 60 can be coupled to the network 70 and the storage system 80 that are defined in the profile (Step 252). To be specific, the application module 25 delivers a test program for connections to the server 60, and the test program performs a processing of sending a packet to the network 70 and accessing the storage system 80. The test program on the server 60 checks whether or not the connections from the I/O interfaces to connection destinations (external apparatuses or devices) are successful (Step 253), and if the connections are successful, the procedure advances to Step 254, while if failed, the procedure advances to Step 255. In Step 254, the application module 25 notifies the user that the connections to the server 60 on which the profile is deployed have been completed. To be specific, the notification is performed by being displayed on the UI or the like. In Step 255, the application module 25 notifies the user that the connections have failed. Here, a retry may be performed from Step 251.

Figure 21:
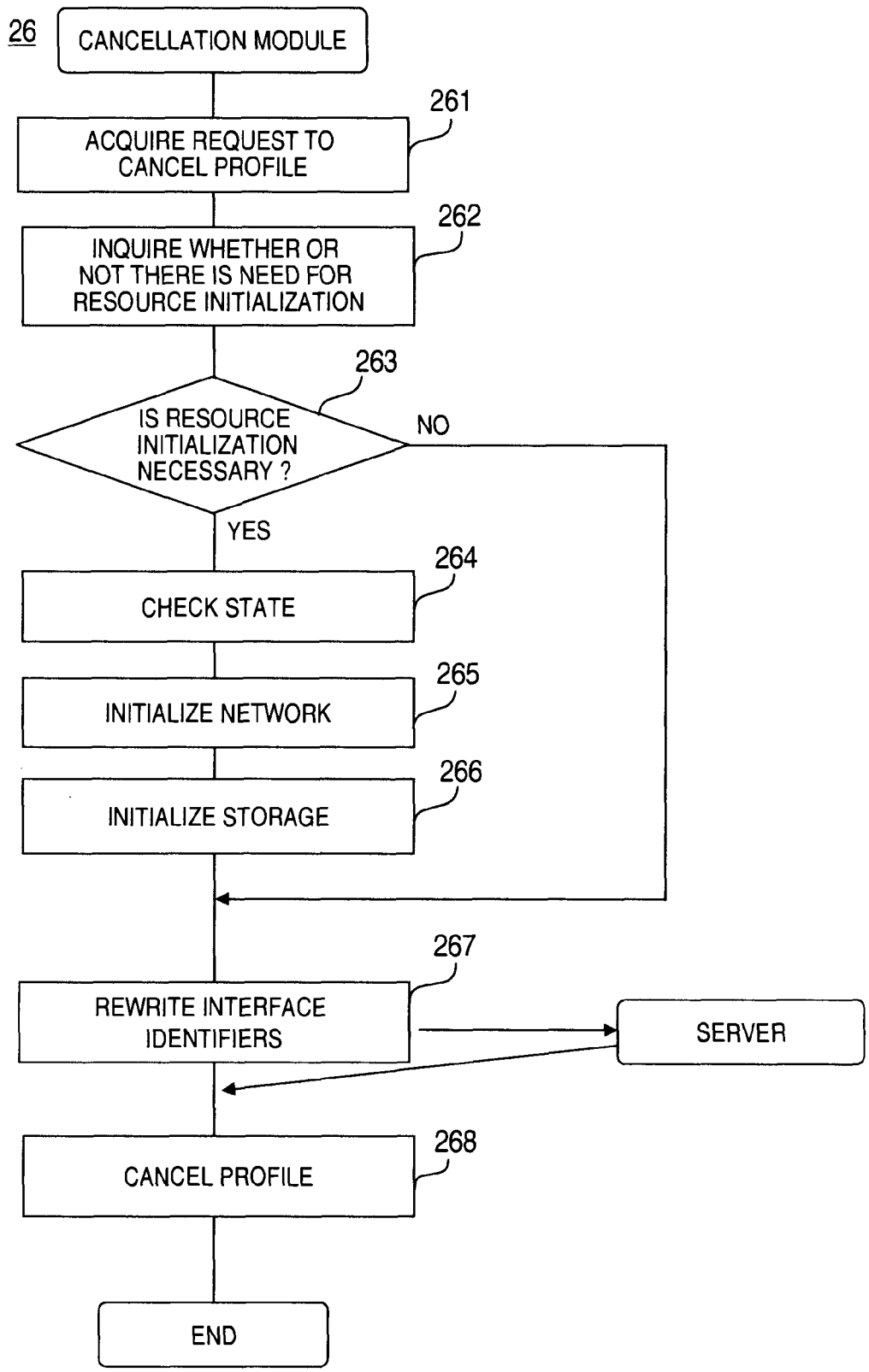
FIG. 21 is a flowchart of a processing performed by the cancellation module of the configuration management program.

FIG. 21 is a flowchart of a processing performed by the cancellation module 26 of the configuration management program 20. Based on an instruction received from the user, the cancellation module 26 acquires a request to cancel the deployment of the profile being operated on the server 60 (Step 261). The request is received through the UI of the configuration management program 20 or the like. Then, the cancellation module 26 inquires whether or not there is a need for initialization of resources (Step 262). To be specific, the cancellation module 26 uses the UI to inquire of the user whether or not to perform initialization of the network 70 and the storage system 80, and acquires information as to whether or not the initialization is necessary. The cancellation module 26 checks whether or not the initialization of resources is necessary (Step 263), and if necessary, the procedure advances to Step 264, while if unnecessary, the procedure advances to Step 267.

In Step 264, the cancellation module 26 checks the state of the server 60 on which the deployment of the profile is to be canceled. Here, the state of the server 60 represents a power supply state or whether or not there is a fault. If the server 60 is in an active state, the cancellation module 26 displays a UI to prompt the user to suspend the operation and waits until the operation is suspended, or automatically shuts down or suspends the server 60. In Step 265, the cancellation module 26 initializes the network 70. To be specific, for example, the cancellation module 26 delivers an initialization program to the server 60 to send an initialization packet for an ARP table to a part or an entirety of the network 70. In Step 266, the cancellation module 26 initializes the storage system 80. To be specific, for example, the cancellation module 26 delivers an initialization program to the server 60 to clear data on a part or an entirety of the storage system 80. It should be noted that the initialization program may be the same as the initialization program delivered in Step 265, and hence the delivery may be performed only once. Further, it is unnecessary to execute both of Steps 265 and 266.

In Step 267, the cancellation module 26 transmits to the server 60 a request to release the interface identifier being used by the server 60 on which the deployment of the profile is to be canceled. In the releasing of the interface identifier being in use, for example, the interface identifiers of the NIC 616 and the HBA 615 installed on the server 60 are returned to the default interface identifiers of the NIC 616 and the HBA 615. In Step 268, the cancellation module 26 performs a canceling processing for the profile. Here, the cancellation module 26 acquires the interface identifiers described as the network indicated by the column 405 and the storage indicated by the column 406 corresponding to the profile to be canceled from the profile DB 40, updates the in-use flags of the corresponding interface identifiers, which are indicated by the column 313 in the identifier pool table 31, to "Pooled", updates the state of the corresponding interface identifier, which is indicated by the column 332 in the network pool table 33, to "pooled", and updates the state of the corresponding interface identifier, which is indicated by the column 342 in the storage pool table 34, to "pooled". In addition, the cancellation module 26 updates the state of the server 60 on which the deployment of the profile is to be canceled, which is indicated by the column 322 in the server pool table 32, to "pooled", updates the deployment server on which the profile to be canceled has been deployed, which is indicated by the column 404 in the profile DB 40, to "undeployed", and clears the network indicated by the column 405 and the storage indicated by the column 406 in the profile DB 40.

According to this embodiment, connections between the server 60 and the external apparatuses such as the network 70 and the storage system 80, which are involved in construction of the computer system and configuration change thereof, are made possible solely by the server 60 changing the interface identifiers. Therefore, in the computer system including the network 70 managed by the network management server 170, the storage system 80 managed by the storage management server 180, and the server 60 managed by the server administrator, it is possible for the server administrator to easily and quickly change the configurations of the external apparatuses or devices coupled to the I/O interfaces of the server 60 only by operating the management server 10 to change the network interface identifier and the storage interface identifier on the server 60. Accordingly, it is possible to select the external apparatus or device for performing communications with the I/O interface only by changing the interface identifier of the I/O interface for coupling the server 60 to the external apparatus or device. Therefore, unlike the conventional example described in the "BACKGROUND OF THE INVENTION" section, the user (or server administrator) of the management server 10 can quickly set the communication path and the access path corresponding to the profile for the server 60 without requesting the administrator of the network management server 170 or the administrator of the storage management server 180 to change the communication path or the access path.

(Second Embodiment)

In the first embodiment, description has been made of the case where the server 60 included in the computer system can be coupled any of the networks 70 and any of the storage systems 80. In a second embodiment, description is made of a case where there exist the network 70 and the storage system 80 to which the server 60 included in the computer system cannot be coupled.

In this embodiment, the server pool table 32 illustrated in FIG. 6 needs to hold connection destination information for the server, which is indicated by a column 324. The column 324 holds information on the network 70 and the storage system 80 to which the server 60 indicated by the column 321 can be coupled. For example, a case where the storage systems 80 to which HBA 1 can be coupled are Storage System 1 and Storage System 2 is described as "HBA1:Storage System 1,Storage System 2".

Figure 22:
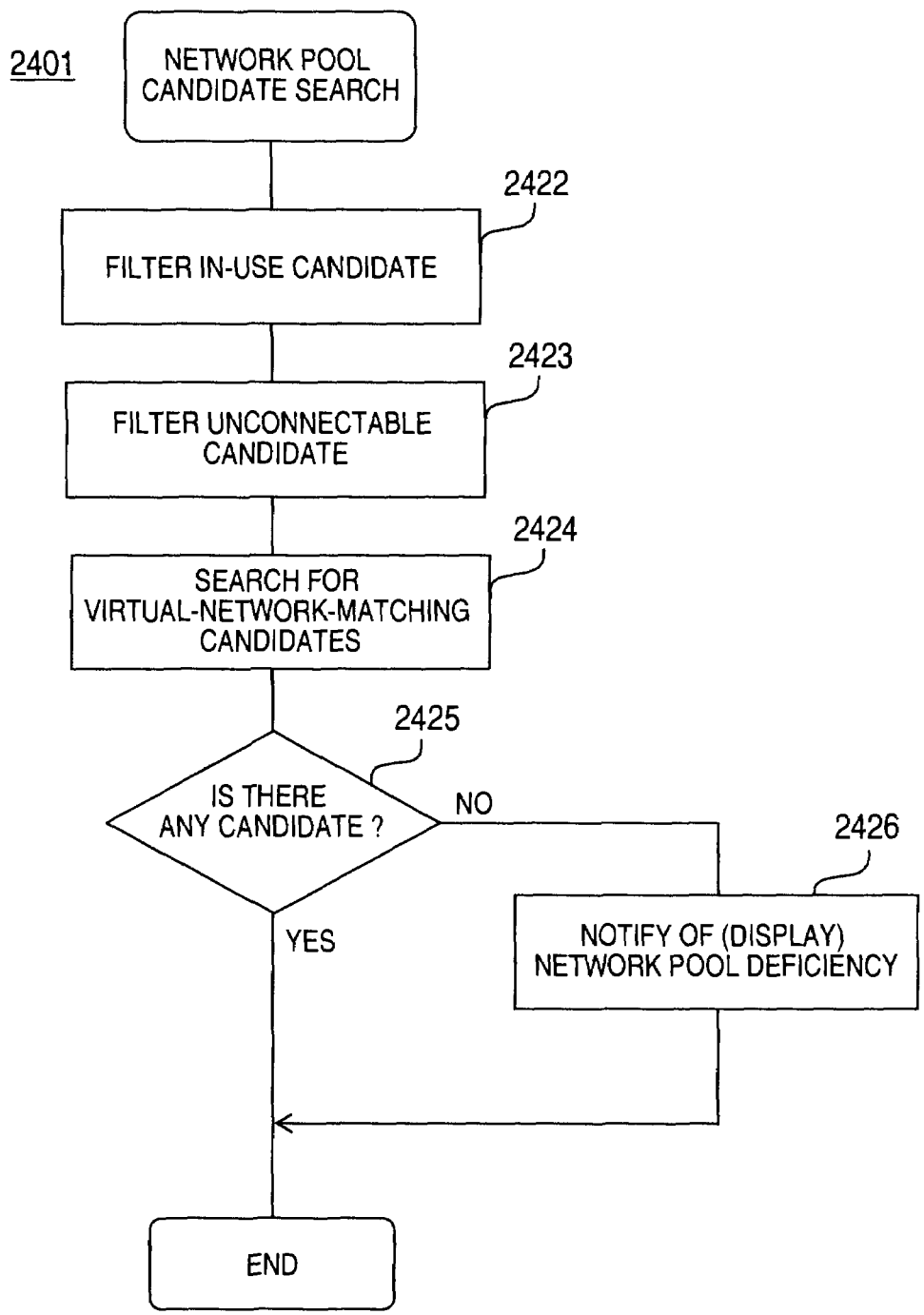
FIG. 22 is a flowchart of a processing performed as a network pool candidate search 2401 according to a second embodiment.

FIG. 22 is a flowchart of a processing performed as a network pool candidate search 2401 according to this embodiment. A processing illustrated in FIG. 22 substitutes the network pool candidate search 2401 performed by the determination module 24 in the first embodiment, which is illustrated in FIG. 18. FIG. 22 is different from the first embodiment in that Step 2423 is added to FIG. 18.

In Step 2423, the determination module 24 filters (removes) the network 70 to which the server 60 of the deployment destination of the profile cannot be coupled. To be specific, the determination module 24 uses the connection destination indicated by the column 324 in the server pool table 32 and the belonging indicated by the column 333 in the network pool table 33 to filter (remove) the network 70 belonging to the network apparatus 701 to which the server 60 of the deployment destination cannot be coupled.

Figure 23:
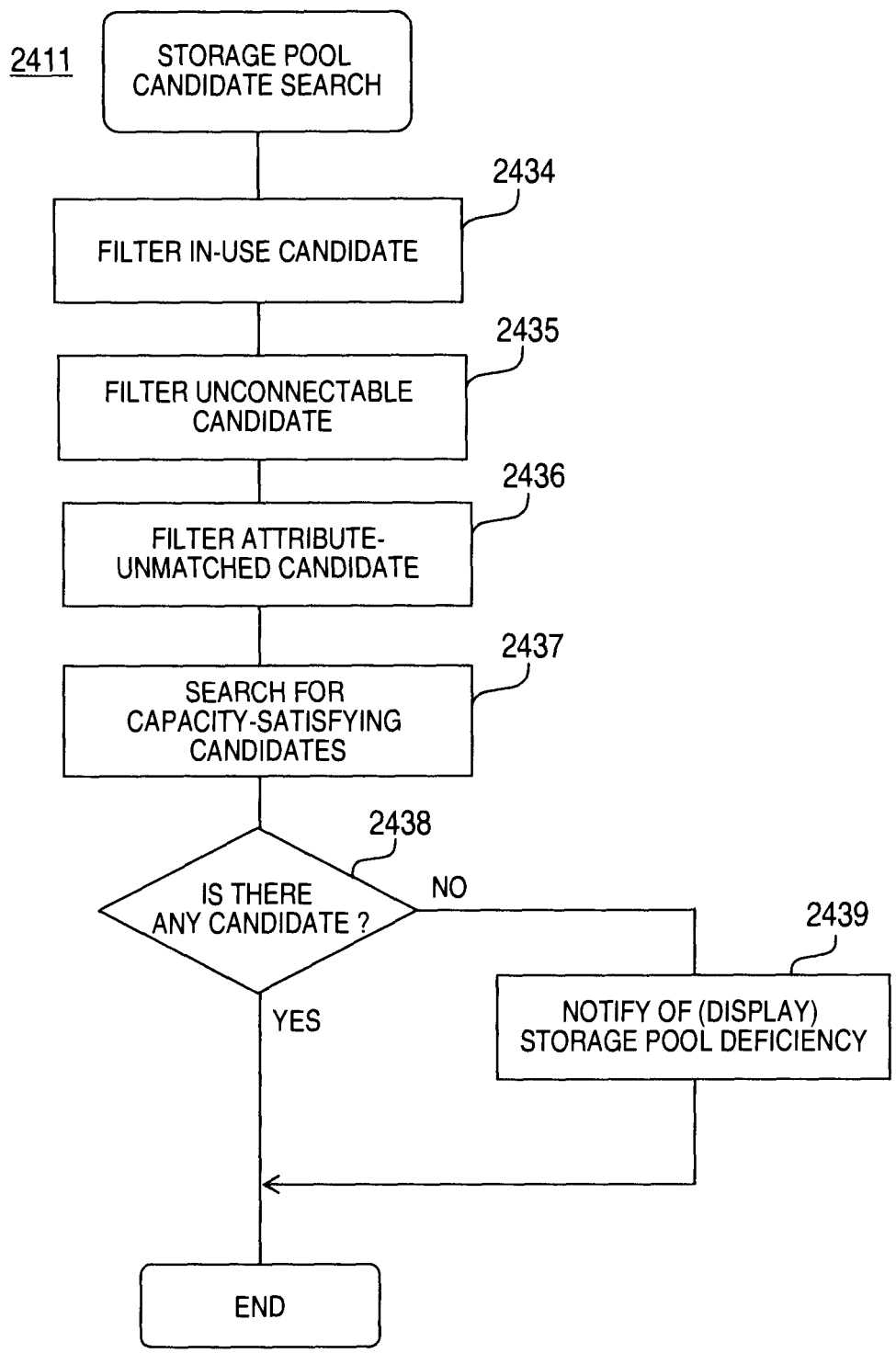
FIG. 23 is a flowchart of a processing performed as a storage pool candidate search 2411 according to the second embodiment.

FIG. 23 is a flowchart of a processing performed as a storage pool candidate search 2411 according to this embodiment. A processing illustrated in FIG. 23 substitutes the storage pool candidate search 2411 performed by the determination module 24 in the first embodiment, which is illustrated in FIG. 19. FIG. 23 is different from the first embodiment in that Step 2435 is added to FIG. 19. In Step 2435, the determination module 24 filters (removes) the storage system 80 to which the server 60 of the deployment destination of the profile cannot be coupled. To be specific, the determination module 24 uses the connection destination indicated by the column 324 in the server pool table 32 and the belonging indicated by the column 343 in the storage pool table 34 to filter the storage (LU 90) belonging to the storage system 80 to which the server 60 of the deployment destination cannot be coupled.

According to this embodiment, even if there exist the network 70 and the storage system 80 to which the server 60 cannot be coupled, it is possible to change the configuration of the computer system by using the network 70 and the storage system 80 to which the server 60 can be coupled.

(Third Embodiment)

In the first and second embodiments, the case of configuring the computer system has been described with regard to all of the servers 60, the networks 70, and the storage systems 80 that are included in the computer system. In a third embodiment, according to the user, the case of changing the configuration of the computer system is described with regard to parts of the servers 60, the networks 70, and the storage systems 80 that are included in the computer system.

Figure 9:
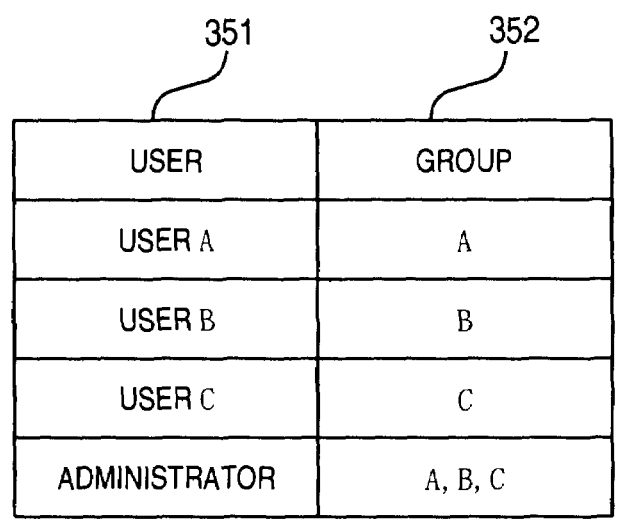
FIG. 9 illustrates an example of the group table according to a third embodiment.

In this embodiment, it is necessary for the table group 30 illustrated in FIG. 1 to include a group table 35 of FIG. 9 for holding the user and group information.

In this embodiment, the information on the group indicated by the column 325 is required in the server pool table 32 illustrated in FIG. 6. The column 325 holds an identifier of a group to which the server 60 indicated by the column 321 belongs. It should be noted that one of the servers 60 may belong to a plurality of groups. In that case, the column 325 holds a plurality of group identifiers.

In this embodiment, the information on the group indicated by the column 335 is required in the network pool table 33 illustrated in FIG. 7. The column 335 holds an identifier of a group to which the corresponding network 70 belongs. It should be noted that one of the networks 70 may belong to a plurality of groups. In that case, the column 335 holds a plurality of group identifiers.

In this embodiment, the information on the group indicated by the column 348 is required in the storage pool table 34 illustrated in FIG. 8. The column 348 holds an identifier of a group to which the corresponding storage system 80 belongs. It should be noted that one of the storage systems 80 may belong to a plurality of groups. In that case, the column 348 holds a plurality of group identifiers.

FIG. 9 illustrates an example of the group table 35. A column 351 holds an identifier of the user. A column 352 holds the identifier of the group available to the user of the column 351. Here, in a case where a plurality of groups are available to the user, identifiers of the plurality of groups are held.

In this embodiment, as an example of a method of acquiring the information on the groups from the server pool table 32, the network pool table 33, and the storage pool table 34, the acquisition module 21 displays a UI for setting the group information after creation of the tables to allow the user to input the group information. The same holds true of the creation of the group table 35.

In this embodiment, before displaying the profile deployment UI, the deployment module 23 displays a UI such as a login screen for authenticating the user, carries out identification of the user, and acquires the group available to the user from the group table 35. In Step 233 performed by the deployment module 23 in the first embodiment, which is illustrated in FIG. 15, the deployment module 23 further uses the group indicated by the column 325 in the server pool table 32 to search for only the servers 60 belonging to the group available to the user as the candidates.

Figure 24:
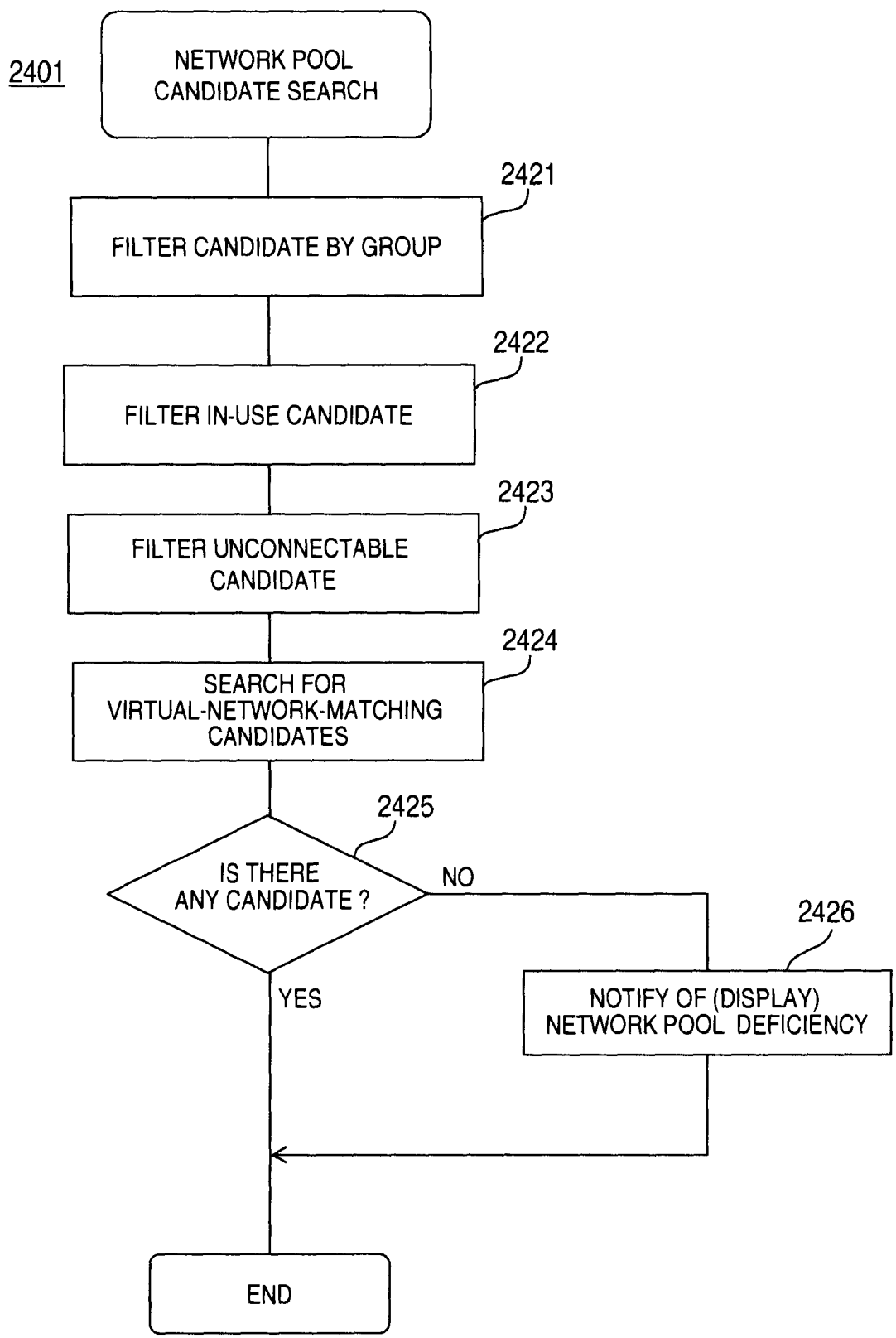
FIG. 24 is a flowchart of a processing performed as a network pool candidate search 2401 according to a third embodiment.

FIG. 24 is a flowchart of a processing performed as a network pool candidate search 2401 according to this embodiment. FIG. 24 is different from the second embodiment in that Step 2421 is added to FIG. 22. In Step 2421, the determination module 24 filters (removes) the network 70 belonging to the group unavailable to the user. To be specific, the determination module 24 uses the group indicated by the column 335 in the network pool table 33 to filter (remove) the network 70 that does not conform to the identifier of the group available to a logged-in user.

Figure 25:
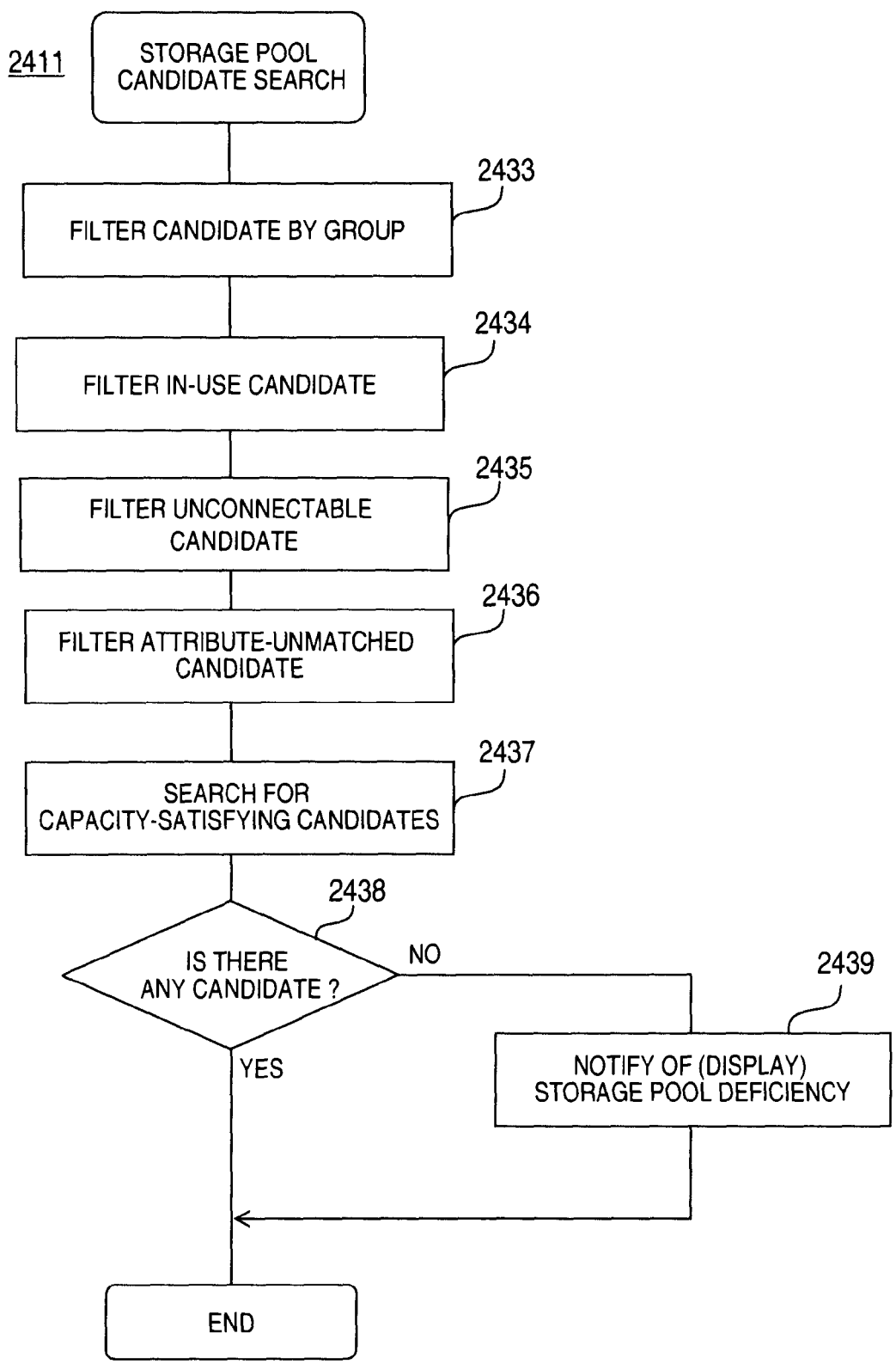
FIG. 25 is a flowchart of a processing performed as a storage pool candidate search 2411 according to the third embodiment.

FIG. 25 is a flowchart of a processing performed as a storage pool candidate search 2411 according to this embodiment. FIG. 25 is different from the second embodiment in that Step 2433 is added to FIG. 23. In Step 2433, the determination module 24 filters the storage system 80 belonging to the group unavailable to the user. To be specific, the determination module 24 uses the group indicated by the column 348 in the storage pool table 34 to filter the storage system 80 that does not conform to the identifier of the group available to the logged-in user.

According to this embodiment, in a case where a plurality of users share the same computer system for its use, limitations can be placed on ranges of the servers 60, the networks 70, and the storage systems 80 that are available to each of the users.

(Fourth Embodiment)

In the first embodiment, description has been made of the case where the server 60 exclusively uses the storage system 80. In a fourth embodiment, description is made of a case where a plurality of servers 60 share the storage system 80.

In this embodiment, it is necessary to reference information on sharing indicated by the column 347 in the storage pool table 34 illustrated in FIG. 8. The column 347 indicates whether or not the storage system 80 is sharable. In FIG. 8, the case where the storage system 80 is sharable is represented by the symbol "○".

Figure 26:
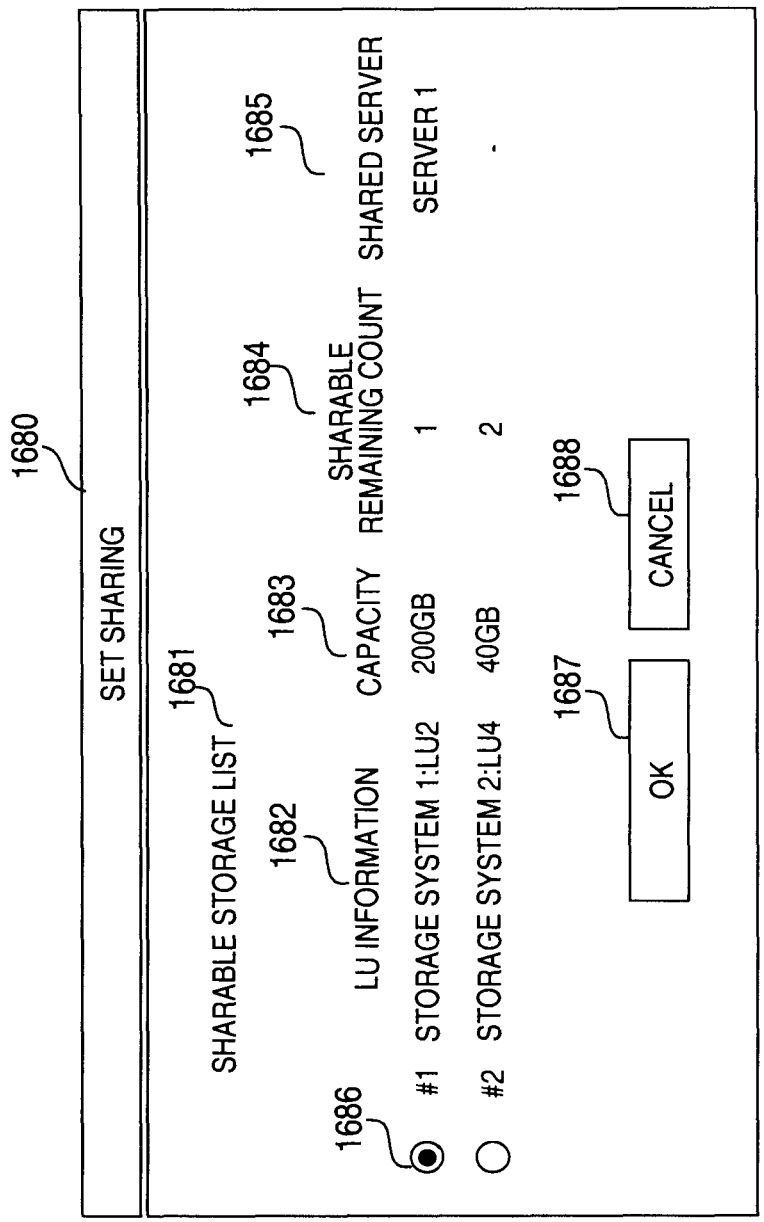
FIG. 26 illustrates an example of the UI for performing the sharing settings for the storage system according to a fourth embodiment.

In this embodiment, a sharing setting button 1609 is included in the UI provided for inputting and updating the profile, which is illustrated in FIG. 11. When the sharing setting button 1609 is clicked on, a UI for performing sharing settings for the storage system 80 is displayed. FIG. 26 illustrates an example of the UI for performing the sharing settings for the storage system 80.

In this embodiment, the profile DB 40 illustrated in FIG. 12 holds the sharing settings for the storage system 80 as the information on the specifications indicated by the column 403. To be specific, if the sharing is unnecessary, "not-share" is held with respect to the information on the storage system 80, and if the sharing is necessary, "share:LU 2" is described as the LU information on an LU to be shared. It should be noted that information on the storage system 80 to which the LU belongs may be additionally held as the LU information.

FIG. 26 illustrates an example of a GUI as an example of a UI for provided by the configuration management program 20 to the user for carrying out the sharing settings. The GUI is displayed on the output device 16 coupled to the management server 10 or a display device or the like of another terminal coupled to the management server 10 via the network 70 by using a browser or a dedicated program with text or other such data. A window 1680 represents a window of a browser or a program. The window 1680 displays a list of candidates for the sharable storage systems 80 and buttons and the like used for operation. In a sharable storage list field 1681, in the form of a list of the storage systems 80 to be candidates, LU information 1682, a capacity 1683, a sharable remaining count 1684, and a shared server 1685 of each of the storage systems 80 are displayed. As the LU information 1682, the storage system identifier and the LU number of the corresponding storage system 80 are displayed. As the capacity 1683, the capacity of the corresponding storage system 80 is displayed. As the sharable remaining count 1684, a value of the number of the remaining storage systems 80 that can be shared is displayed. The value is calculated based on the remaining count of the storage interface identifiers of the storage interfaces that can be coupled to the corresponding storage system 80. As the shared server 1685, the identifier of the server 60 to which the corresponding storage system 80 is currently allocated is displayed. The user clicks on a button 1686 to select the storage system 80. The selected button 1686 is displayed as a double circle in the example of FIG. 26. When an "OK" button 1687 is clicked on with the storage system 80 being selected, the selection of the storage system 80 is determined. To cancel the sharing settings, a "cancel" button 1688 is clicked on.

Figure 27:
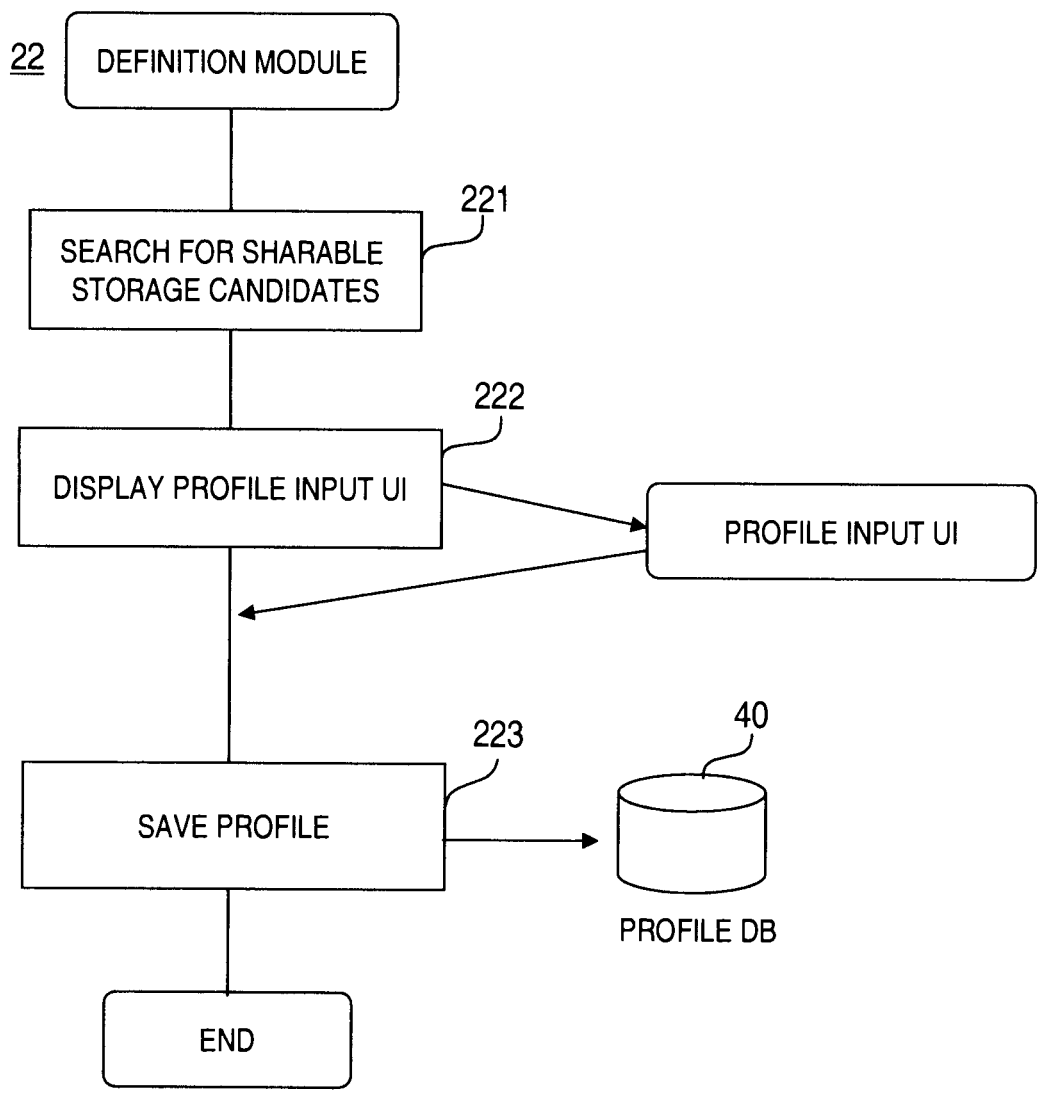
FIG. 27 is a flowchart of a processing performed by the definition module according to the fourth embodiment.

FIG. 27 is a flowchart of a processing performed by the definition module 22 according to this embodiment. FIG. 27 is different from the third embodiment in that Step 221 is added to FIG. 13. In Step 221, the definition module 22 searches for candidates for the sharable storage systems 80. To be specific, the definition module 22 lists the candidates with the symbol "○" set as the information on the sharing indicated by the column 347 in the storage pool table 34. The thus-listed storage systems 80 are displayed on the sharing setting UI illustrated in FIG. 26.

Figure 28:
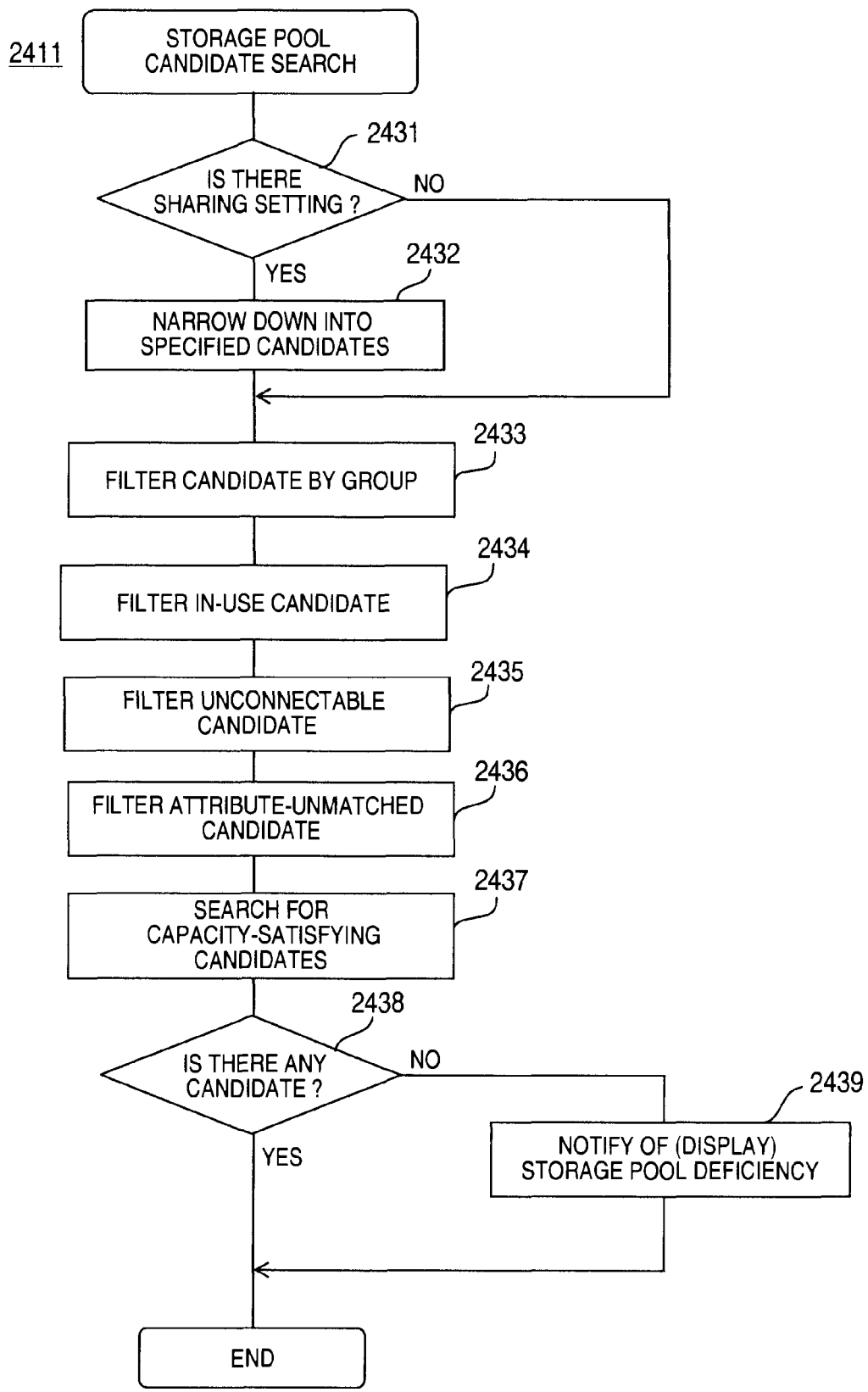
FIG. 28 is a flowchart of a processing performed as a storage pool candidate search 2411 according to the fourth embodiment.

FIG. 28 is a flowchart of a processing performed as a storage pool candidate search 2411 according to this embodiment. FIG. 28 is different from the third embodiment in that Steps 2431 and 2432 are added to FIG. 25. In Step 2431, the determination module 24 checks whether or not the profile includes a setting for a shared storage system. If the setting for the shared storage system is included, the procedure advances to Step 2432. Here, to be specific, the profile including a setting for a shared storage means that there exists the storage system 80 having information of "share" in the specifications indicated by the column 403 in the profile DB 40. In Step 2432, the determination module 24 narrows down the candidates into the specified storage systems 80. To be specific, based on the LU information described in the information of the specifications indicated by the column 403 in the profile DB 4Q, the determination module 24 narrows down the candidates into the storage systems 80 that can be coupled to the corresponding LUs 90.

According to this embodiment, it is possible to construct the computer system in which the plurality of servers 60 share one storage system 80 for its use as the shared storage system.

(Fifth Embodiment)

In the first embodiment, description has been made of the case where one OS is executed on one server 60. In a fifth embodiment, description is made of a case where an OS can be executed on each of a plurality of virtual servers being run on one server 60.

Figure 29:
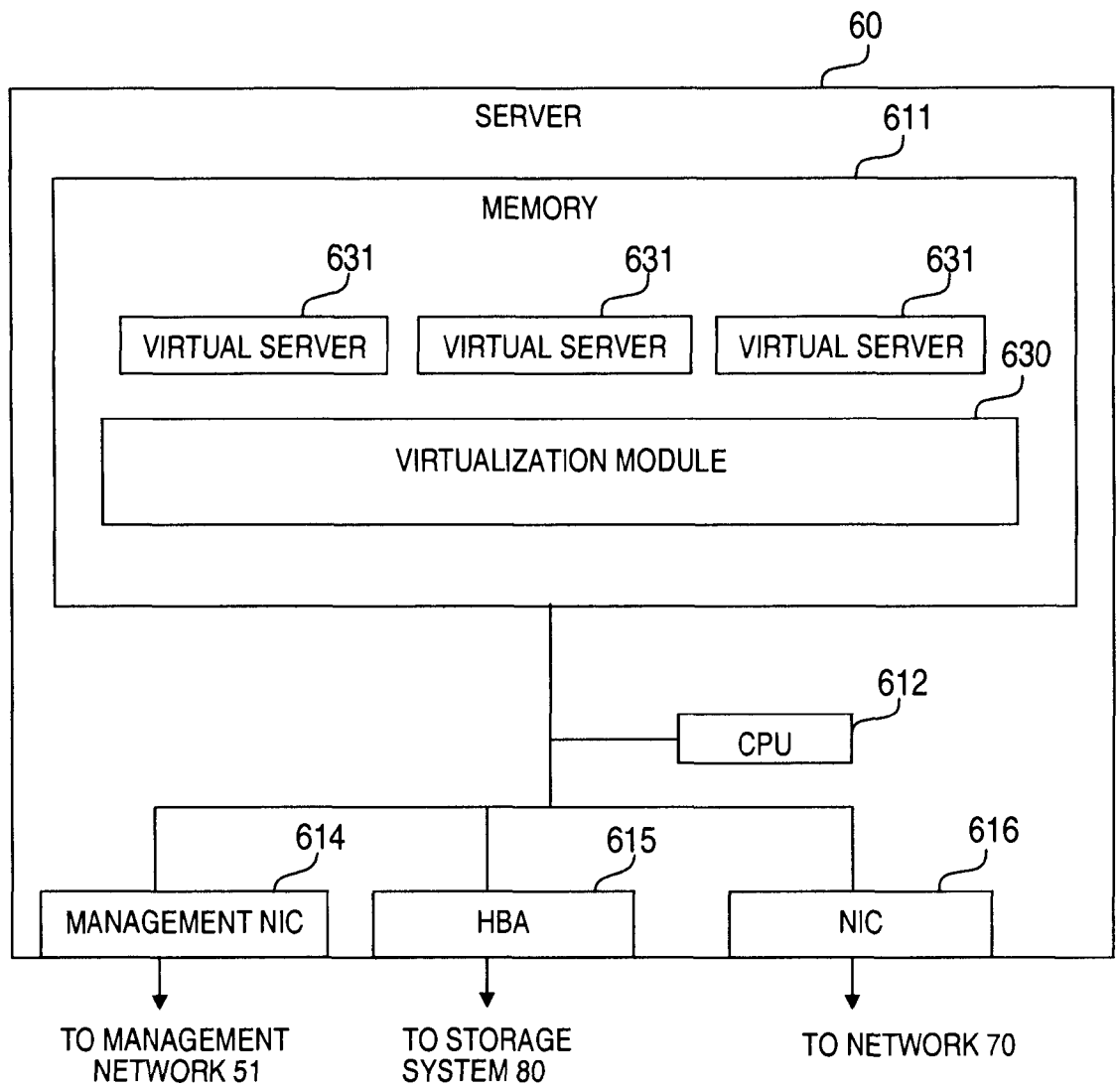
FIG. 29 illustrates a configuration of the server according to a fifth embodiment.

FIG. 29 illustrates a configuration of the server 60 according to this embodiment. FIG. 29 is different from the first embodiment in that the memory 611 holds a virtualization module 630 and virtual servers 631 unlike FIG. 2. The virtualization module 630 is a hypervisor, which is also referred to as a virtual machine monitor, for managing execution of the virtual servers 631 on the server 60, and each of the virtual servers 631 has an OS executed thereon.

This embodiment is different from the first embodiment in the method of rating the server 60 performed in Step 234 of FIG. 15. Specifically, the number of stars increases if the values of the specification information of the profile are smaller than the values of the specification information on the server 60, and if larger, the number of stars decreases.

Figure 30:
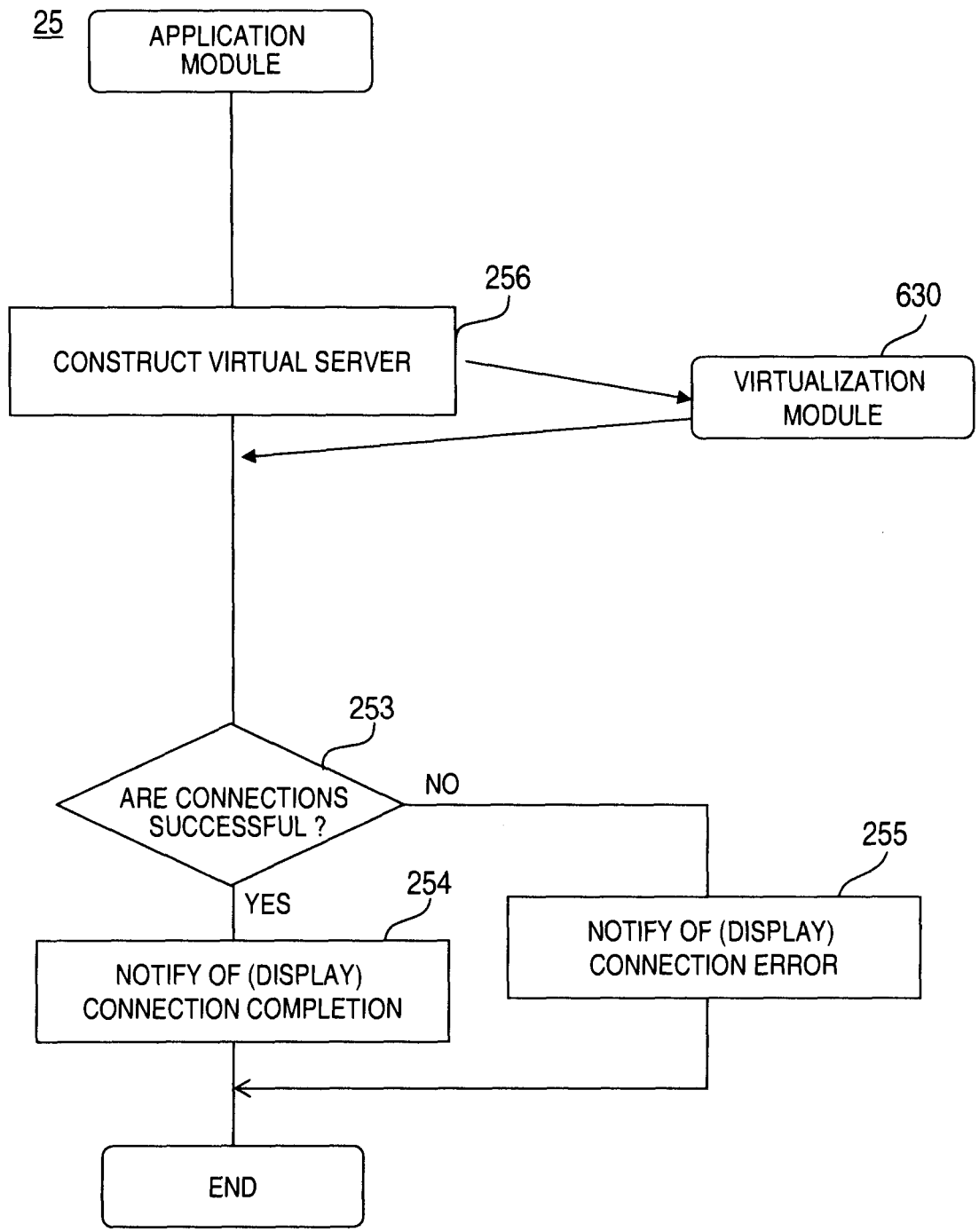
FIG. 30 is a flowchart of a processing performed by the application module according to the fifth embodiment.

FIG. 30 is a flowchart of a processing performed by the application module 25 according to this embodiment. FIG. 30 is different from the first embodiment in that Step 256 and the virtualization module 630 are added to FIG. 20, and Steps 251 and 252 are deleted therefrom. In Step 256, the application module 25 requests the virtualization module 630 to construct the virtual server 631 according to the profile. Here, the application module 25 requests the virtualization module 630 to set interface identifiers of a virtual NIC and a virtual HBA that are created in correspondence with the virtual server 631 to the interface identifiers acquired by the application module 25 from the determination module 24. The virtualization module 630 creates the virtual server 631 as requested, and carries out settings of the interface identifiers of the virtual NIC and the virtual HBA corresponding to the virtual server 631.

According to this embodiment, it is possible to construct the computer system in which the virtual server 631 operates on the server 60.

(Sixth Embodiment)

In the first embodiment, description has been made of the case where the server 60 includes the NIC 616 and the HBA 615 in a fixed manner. In a sixth embodiment, description is made of a case where the NIC and the HBA of the server 60 can be changed.

Figure 31:
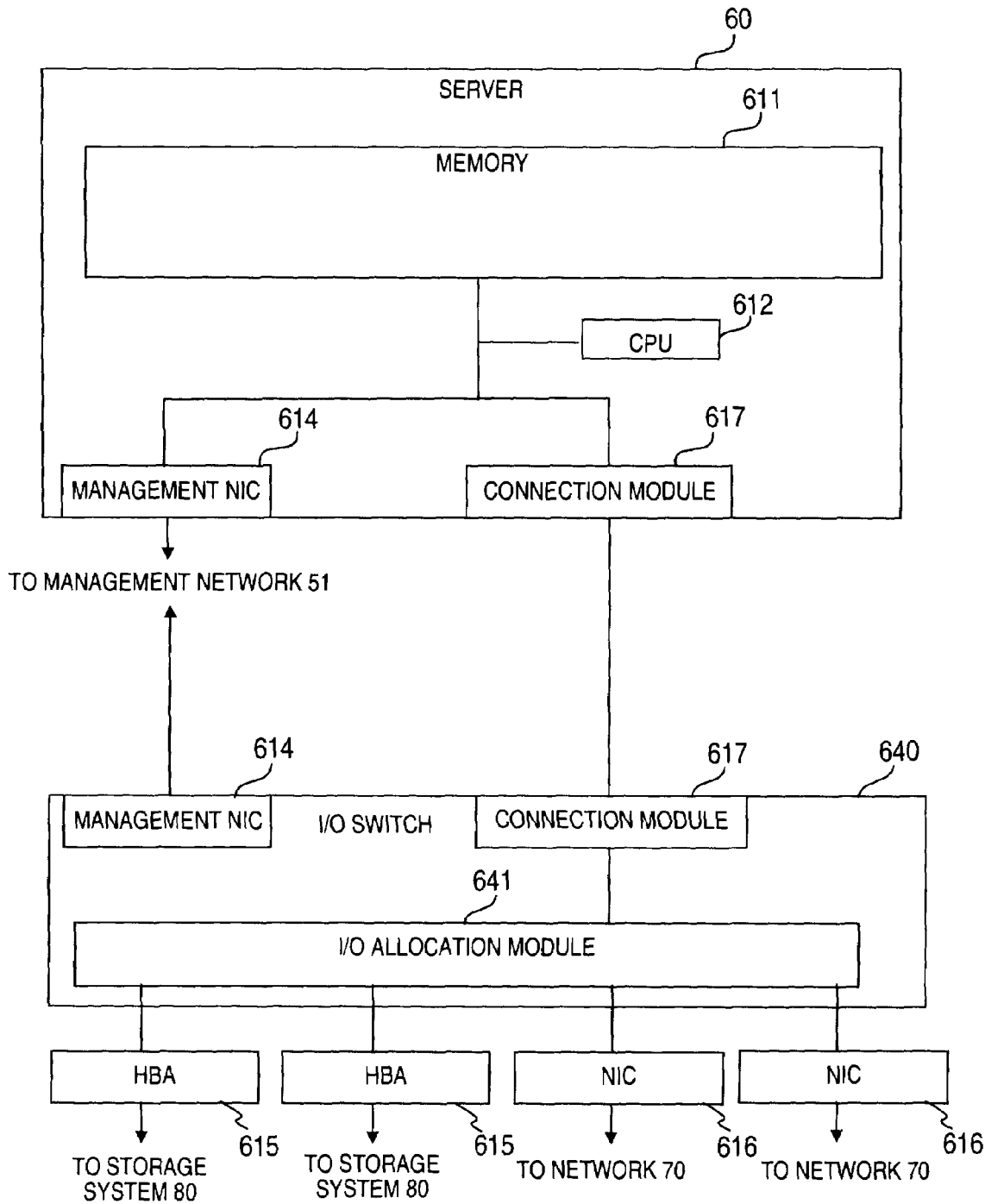
FIG. 31 illustrates a configuration of the server 60 according to a sixth embodiment.

FIG. 31 illustrates a configuration of the server 60 according to this embodiment. FIG. 31 is different from the first embodiment in that the server 60 does not include the identifier rewriting program 620 and is coupled to an I/O switch 640 via a connection module 617. The I/O switch 640 includes the management NIC 614, the connection module 617, and an I/O allocation module 641, and is coupled to the at least one HBA 615 and the at least one NIC 616 via ports (not shown) on a downstream (interface side) of the I/O allocation module 641. In response to a command received from the management NIC 614 of the server 60, the I/O allocation module 641 can change allocations of the server 60 with respect to the HBA 615 and the NIC 616.

In this embodiment, in Step 251 of FIG. 20 described in the first embodiment, the application module 25 notifies the I/O allocation module 641 of the interface identifiers acquired from the determination module 24. The I/O allocation module 641 allocates the HBA 615 and the NIC 616 having the acquired interface identifiers to the server 60.

In this embodiment, in Step 267 of FIG. 21 described in the first embodiment, the cancellation module 26 releases the allocations of the NIC and the HBA with respect to the server 60.

According to this embodiment, it is possible to construct the computer system even in a case where the server 60 does not include interface identifier rewriting means.

(Supplementary)

It should be noted that in a server-computer configuration management method according to claim 1, one example of the interface identifier is a WWN.

Further, in the server-computer configuration management method according to Claim 1, one example of the interface identifier is a MAC address.

Further, in a server-computer configuration management method according to Claim 2, the network identifier is a virtual network (VLAN) number.

As has been described above, this invention can be applied to a computer system including a plurality of servers managed by a management server, an external apparatus having a communication path set in advance, and an I/O interface provided to each server, for performing communications with the external apparatus. In particular, this invention can be applied to a management server and a management program for managing a plurality of servers.

While the present invention has been described in detail and pictorially in the accompanying drawings, the present invention is not limited to such detail but covers various obvious modifications and equivalent arrangements, which fall within the purview of the appended claims.

What is claimed is:

1. A method of managing a configuration of a computer system comprising a plurality of servers, a management server configured to manage the plurality of servers, and a plurality of storage apparatuses and a plurality of network apparatuses, the servers each including a plurality of interfaces for coupling to storage apparatuses and/or network apparatuses, the storage apparatuses each providing one or more logical storage units and holding at least one of interface identifiers of the plurality of interfaces for individually permitting access to the logical storage units, the network apparatuses each providing one or more virtual networks and holding at least one of interface identifiers of the plurality of interfaces for individually permitting access to the virtual networks, the management server holding:

server pool data indicating specifications of the servers, and states of use of the servers;

storage pool data indicating specifications of the logical storage units, interface identifiers of respective of the interfaces permitted to access the logical storage units, and states of use of the logical storage units; and network pool data indicating specifications of the virtual networks, interface identifiers of respective of the interfaces permitted to access to the virtual networks, and states of use of the virtual networks, the method comprising the steps of:

receiving, by the management server, a profile to be deployed onto one of the plurality of servers;

selecting, by the management server, a first server which satisfies a specification required by the profile and is not in use from the server pool data;

selecting, by the management server, a first logical storage unit which satisfies the specification required by the profile and is not in use from the storage pool data, and acquiring a first interface identifier of a respective one of the interfaces permitted to access the selected first logical storage unit from the storage pool data;

selecting, by the management server, a first virtual network which satisfies the specification required by the profile and is not in use from the network pool data, and acquiring a second interface identifier of a respective one of the interfaces permitted to access to the selected first virtual network from the network pool data;

sending, by the management server, to the selected first server, an instruction to rewrite an interface identifier of a first one of the interfaces in the selected first server to the first interface identifier and to rewrite an interface identifier of a second one of the interfaces in the selected first server to the second interface identifier;

rewriting, by the selected first server, the interface identifier of the first interface in the selected first server to the first interface identifier permitted to access the selected first logical storage unit according to the instruction; and rewriting, by the selected first server, the interface identifier of the second interface in the selected first server to the second interface identifier permitted to access to the selected first virtual network according to the instruction.

2. The method according to claim 1, further comprising the steps of:

receiving, by the management server, a release request to release use of one of the plurality of servers;

notifying, by the management server, the server on which the release request has been received of release of the interface identifiers provided for the server; and updating, by the management server, the states of use of the logical storage units and/or the virtual networks corresponding to the interface identifiers notified of the release to "not-in-use" in the storage pool data and/or the network pool data.

3. The method according to claim 1, wherein:

the management server further holds group data indicating relationships between users of the servers and group identifiers of groups to which the users belong;

the server pool data holds group identifiers of groups to which the interface identifiers belong;

the storage pool data and the network pool data hold group identifiers for the logical storage units and the virtual networks;

the method further comprises the steps of:

receiving, by the management server, a user who uses the one of the plurality of servers;

identifying, by the management server, a group identifier of a group to which the user belongs from the group data; and selecting, by the management server, logical storage units and virtual networks satisfying the profile each comprises acquiring one of the interface identifiers associated with the group identifier matching the identified group identifier.

4. A computer system, comprising:

a plurality of servers;

a management server configured to manage the plurality of servers; and a plurality of storage apparatuses and a plurality of network apparatuses, the servers each including a plurality of interfaces for coupling to storage apparatuses and/or network apparatuses; and the storage apparatuses each providing one or more logical storage units and holding at least one of interface identifiers of the plurality of interfaces for individually permitting access to the logical storage units, the network apparatuses each providing one or more virtual networks and holding at least one of interface identifiers of the plurality of interfaces for individually permitting access to the virtual networks, the management server holding:

server pool data indicating specifications of the servers, and states of use of the servers;

storage pool data indicating specifications of the logical storage units, interface identifiers of respective of the interfaces permitted to access the logical storage units, and states of use of the logical storage units; and network pool data indicating specifications of the virtual networks, interface identifiers of respective of the interfaces permitted to access to the virtual networks, and states of use of the virtual networks, the management server further configured to:

receive a profile to be deployed onto one of the plurality of servers;

select a first server which satisfies a specification required by the profile and is not in use from the server pool data;

select a first logical storage unit which satisfies the specification required by the profile and is not in use from the storage pool data, and acquire a first interface identifier of a respective one of the interfaces permitted to access the selected logical storage unit;

select a first virtual network which satisfies the specification required by the profile and is not in use from the network pool data, and acquire a second interface identifier of a respective one of the interfaces permitted to access to the selected first virtual network from the network cool data; and send the selected first server an instruction to rewrite an interface identifier of a first one of the interfaces in the selected first server to the first interface identifier and to rewrite an interface identifier of a second one of the interfaces in the selected first server to the second interface identifier; and wherein the selected first server is configured to:

rewrite the interface identifier of the first interface in the selected first server to the first interface identifier permitted to access the selected first logical storage unit according to the instruction sent from the management server; and rewrite the interface identifier of the second interface in the selected first server to the second interface identifier permitted to access to the selected first virtual network according to the instruction sent from the management server.

5. The computer system according to claim 4, wherein the management server is further configured to:

receive a release request to release use of one of the plurality of servers;

notify the server on which the release request has been received of release of the interface identifiers provided for the server; and update the states of use of the logical storage units and/or the virtual networks corresponding to the interface identifiers notified of the release to "not-in-use" in the storage pool data and/or the network pool data.

6. The computer system according to claim 4, wherein:

the management server further holds group data indicating relationships between users of the servers and group identifiers of groups to which the users belong;

the server pool data holds group identifiers of groups to which the interface identifiers belong, and the storage pool data and the network pool data hold group identifiers for the logical storage units and the virtual networks, the management server further configured to:

receive a user who uses the one of the plurality of servers;

identify a group identifier of a group to which the user belongs from the group data; and select logical storage units and virtual networks satisfying the profile each comprises acquiring one of the interface identifiers associated with the group identifier matching the identified group identifier.

7. A non-transitory computer readable medium storing a program with program code for managing a configuration of a computer system comprising a plurality of servers, the program for execution by the computer system comprising:

the plurality of servers;

a management server configured to manage the plurality of servers; and a plurality of storage apparatuses and a plurality of network apparatuses, the servers each including a plurality of interfaces for coupling to storage apparatuses and/or network apparatuses, the storage apparatuses each providing one or more logical storage units and holding at least one of interface identifiers of the plurality of interfaces for individually permitting access to the logical storage units, the network apparatuses each providing one or more virtual networks and holding at least one of interface identifiers of the plurality of interfaces for individually permitting access to the virtual networks, the management server holding:

server pool data indicating specifications of the servers, and states of use of the servers;

storage pool data indicating specifications of the logical storage units, interface identifiers of respective of the interfaces permitted to access the logical storage units, and states of use of the logical storage units; and network pool data indicating specifications of the virtual networks, interface identifiers of respective of the interfaces permitted to access to the virtual networks, and states of use of the virtual networks, the program to be executed by the computer system to perform the procedures of:

receiving a profile to be deployed onto one of the plurality of servers;

selecting a first server which satisfies a specification required by the profile and is not in use from the server pool data;

selecting a first logical storage unit which satisfies the specification required by the profile and is not in use from the storage pool data, and acquiring a first interface identifier of a respective one of the interfaces permitted to access the selected logical storage unit;

selecting a first virtual network which satisfies the specification required by the profile and is not in use from the network pool data, and acquiring a second interface identifier of a respective one of the interfaces permitted to access to the selected first virtual network from the network pool data;

sending the selected first server an instruction to rewrite an interface identifier of a first one of the interfaces in the selected first server to the first interface identifier and to rewrite an interface identifier of a second one of interfaces in the selected first server to the second interface identifier;

rewriting the interface identifier of the first interface in the selected first server to the first interface identifier permitted to access the selected first logical storage unit according to the instruction; and rewriting the interface identifier of the second interface in the selected first server to the second interface identifier permitted to access to the selected first virtual network according to the instruction.

8. The non-transitory computer readable medium of claim 7, the program further comprising program code to perform the procedures of:

receiving a release request to release use of one of the plurality of servers;

notifying the server on which the release request has been received of release of the interface identifiers provided for the server; and updating the states of use of the logical storage units and/or the virtual networks corresponding to the interface identifiers notified of the release to "not-in-use" in the storage pool data and/or the network pool data.

9. The non-transitory computer readable medium of claim 7, wherein:
the management server further holds group data indicating relationships between users of the servers and group identifiers of groups to which the users belong,
the server pool data holds group identifiers of groups to which the interface identifiers belong, and
the storage pool data and the network pool data hold group identifiers for the logical storage units and the virtual networks,
the program further comprising program code to perform the procedures of:
receiving a user who uses the one of the plurality of servers;
identifying a group identifier of a group to which the user belongs from the group data; and
selecting logical storage units and virtual networks satisfying the profile each comprises acquiring one of the interface identifiers associated with the group identifier matching the identified group identifier.

* * * * *